United States Patent
Hart, III

(10) Patent No.: US 10,259,599 B2
(45) Date of Patent: Apr. 16, 2019

(54) SPACECRAFT WITH RIGID ANTENNA REFLECTOR DEPLOYED VIA LINEAR EXTENSION BOOM

(71) Applicant: Space Systems/Loral, LLC, Palo Alto, CA (US)

(72) Inventor: William G. Hart, III, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 436 days.

(21) Appl. No.: 14/962,941

(22) Filed: Dec. 8, 2015

(65) Prior Publication Data

US 2017/0158357 A1    Jun. 8, 2017

(51) Int. Cl.
 *B64G 1/66* (2006.01)
 *B64G 1/22* (2006.01)
(52) U.S. Cl.
 CPC ............... *B64G 1/66* (2013.01); *B64G 1/222* (2013.01)
(58) Field of Classification Search
 CPC ........ B64G 1/222; B64G 1/66; B64G 1/1007; B64G 1/641; B64G 1/646;
 (Continued)

(56) References Cited

U.S. PATENT DOCUMENTS 3,608,844 A * 9/1971 Tumulty, Jr. ............ B21C 47/18
 242/373

3,690,080 A * 9/1972 Dillard ................... B64G 1/222
 136/245
(Continued)

FOREIGN PATENT DOCUMENTS

EP        085894 A1 * 8/1998
EP        0858946        8/1998
(Continued)

OTHER PUBLICATIONS

Mobrem et al. "Design and Performance of the Telescopic Tubular Mast", 2012.*

(Continued)

*Primary Examiner* — Assres H Woldemaryam
(74) *Attorney, Agent, or Firm* — Weaver Austin Villeneuve & Sampson LLP

(57) ABSTRACT

A spacecraft with a linear extension boom, an antenna feed, and a rigid antenna reflector is provided. The rigid antenna reflector may be connected with one end of the linear extension boom, and the other end of the linear extension boom may be connected with the spacecraft main body. In a launch configuration of the spacecraft, the linear extension boom may be retracted into a stowed configuration, and in an on-orbit configuration of the spacecraft, the linear extension boom may be extended into a deployed configuration, thereby moving the rigid antenna reflector away from the yaw axis of the spacecraft and positioning the rigid antenna reflector such that the focal point of the rigid antenna reflector may be oriented to align on, and be collocated with, the antenna feed. The rigid antenna reflector may be connected with the linear extension boom by a positioning mechanism that provides for adjustment in the angular orientation of the rigid antenna reflector relative to the linear extension boom.

20 Claims, 13 Drawing Sheets

(58) Field of Classification Search
CPC ...... B64G 2001/1092; B64G 2001/224; B64G 1/407; B64G 1/64; B64G 1/1021; B64G 1/1078; B64G 1/007; B64G 1/105; B64G 1/34; B64G 1/363

See application file for complete search history.

(56) References Cited

U.S. PATENT DOCUMENTS

| | | | | |
|---|---|---|---|---|
| 4,550,319 | A * | 10/1985 | Ganssle | H01Q 1/18 343/882 |
| 4,634,086 | A | 1/1987 | Mori | |
| 5,816,540 | A * | 10/1998 | Murphy | B64G 1/24 244/164 |
| 5,833,175 | A * | 11/1998 | Caplin | B64G 1/10 244/158.1 |
| 5,857,648 | A * | 1/1999 | Dailey | B64G 1/22 244/172.6 |
| 5,961,092 | A * | 10/1999 | Coffield | H01Q 1/125 248/230.1 |
| 5,966,104 | A * | 10/1999 | Massey | H01Q 1/288 343/881 |
| 6,037,913 | A | 3/2000 | Johnson | |
| 6,195,066 | B1 * | 2/2001 | Pegues, Jr. | H01Q 1/1221 248/237 |
| 6,256,938 | B1 * | 7/2001 | Daton-Lovett | F16H 19/64 138/119 |
| 7,028,953 | B2 * | 4/2006 | Sebata | B64G 1/503 244/171.8 |
| 7,062,221 | B1 | 6/2006 | Christensen | |
| 7,602,349 | B2 * | 10/2009 | Hentosh | H01Q 1/1228 244/172.6 |
| 8,448,902 | B2 * | 5/2013 | Gelon | B64G 1/1007 244/158.1 |
| 8,487,830 | B2 * | 7/2013 | Texier | H01Q 1/288 343/881 |
| 8,683,755 | B1 * | 4/2014 | Spence | B64G 1/222 136/245 |
| 8,893,442 | B1 | 11/2014 | Spence et al. | |
| 9,004,409 | B1 * | 4/2015 | Baghdasarian | B64G 1/22 244/172.6 |
| 9,120,583 | B1 * | 9/2015 | Spence | H02S 30/20 |
| 9,650,160 | B2 * | 5/2017 | Celerier | B64G 1/1007 |
| 2002/0145082 | A1 * | 10/2002 | Bertheux | B64G 1/503 244/172.6 |
| 2006/0227063 | A1 * | 10/2006 | Richer | H01Q 15/14 343/912 |
| 2007/0146227 | A1 * | 6/2007 | Brooks | B64G 1/222 343/881 |
| 2011/0210209 | A1 * | 9/2011 | Taylor | B64G 1/222 244/172.6 |
| 2012/0068019 | A1 * | 3/2012 | Boccio | H01Q 1/08 244/172.6 |
| 2013/0061541 | A1 * | 3/2013 | Taylor | B29C 67/0014 52/108 |
| 2014/0064905 | A1 * | 3/2014 | Prahlad | H02N 13/00 414/751.1 |

FOREIGN PATENT DOCUMENTS

| | | |
|---|---|---|
| GB | 1201070 | 8/1970 |
| WO | 2001/057949 | 8/2001 |
| WO | 2005097595 | 10/2005 |
| WO | 2012168741 | 12/2012 |
| WO | 2017123349 | 7/2017 |

OTHER PUBLICATIONS

Lawton, "Design, development and delivery of innovative, cost-reducing deployable structures for the global space industry". Mar. 2015.*

Belvin, W. Keith, "Advances in Structures for Large Space Systems," American Institute of Aeronautics and Astronautics, 10 pp. Jan. 1, 2004.

Davis, et al., "Big Deployables in Small Satellites," $28^{th}$ Annual AIAA/USU Conference on Small Satellites, 8 pp. 2014.

Farley, Rodger, "Spacecraft Deployables," Principles of Space Systems Design, 23 pp. Created Dec. 12, 2006.

Jenson, et al., "Arm Development Review of Existing Technologies," 50 pp. Dated Jun. 25, 2001.

Murphey, et al., "Deployable Booms and Antennas Using Bi-stable Tape-springs," $24^{th}$ Annual AIAA/USU Conference on Small Satellites, 7 pp. 2010.

Pellegrino, et al., "Small Satellite Deployment Mechanisms," 80 pp. Dated Nov. 9, 2000.

"Tubular Spacecraft Booms (Extendible, Reel Stored)," NASA Space Vehicle Design Criteria (Guidance and Control), 54 pp. Feb. 1971.

Turse, Dana, "Deployable Articulating Array for Nanosatellites," CubeSat Developers' Workshop, 23 pp. Presented Aug. 10-11, 2013.

International Search Report and Written Opinion dated Sep. 13, 2017 in PCT/US2016/065444.

YouTube video (https://www.youtube.com/watch?v—UwimGkYvNdo) listing publication date of Dec. 1, 2015, 7 pgs.

* cited by examiner

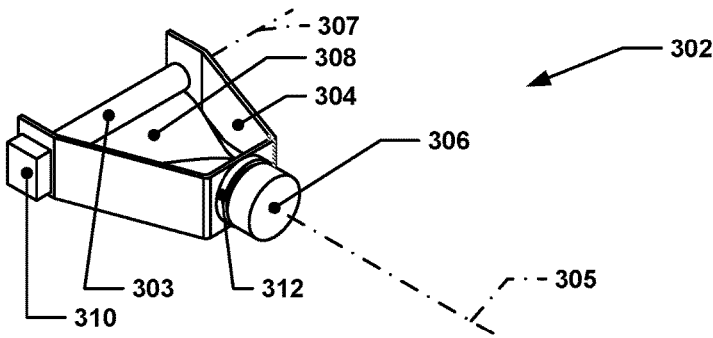
Figure 3
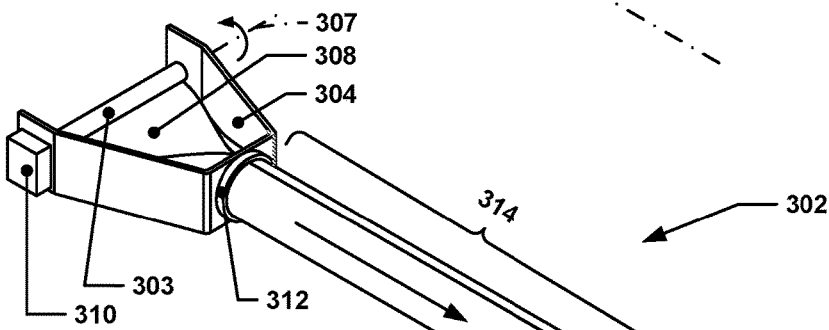
Figure 4
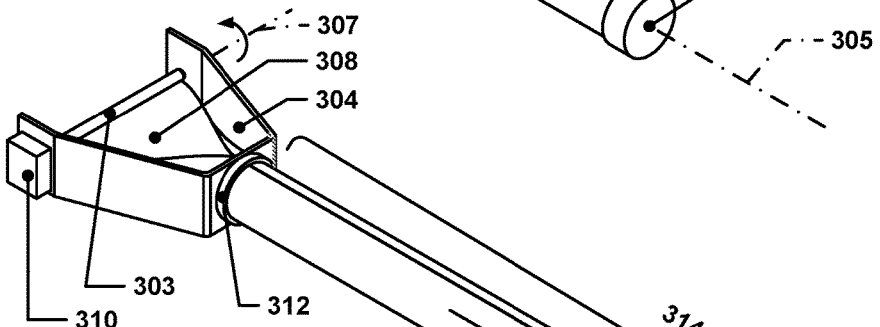
Figure 5
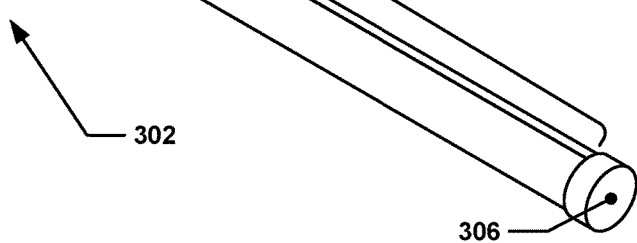

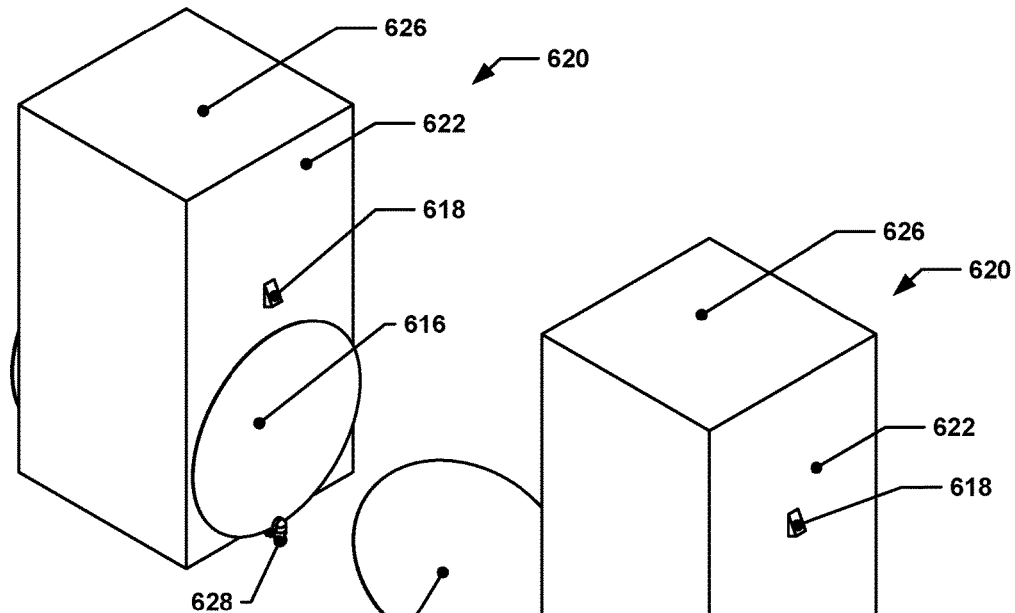
Figure 9
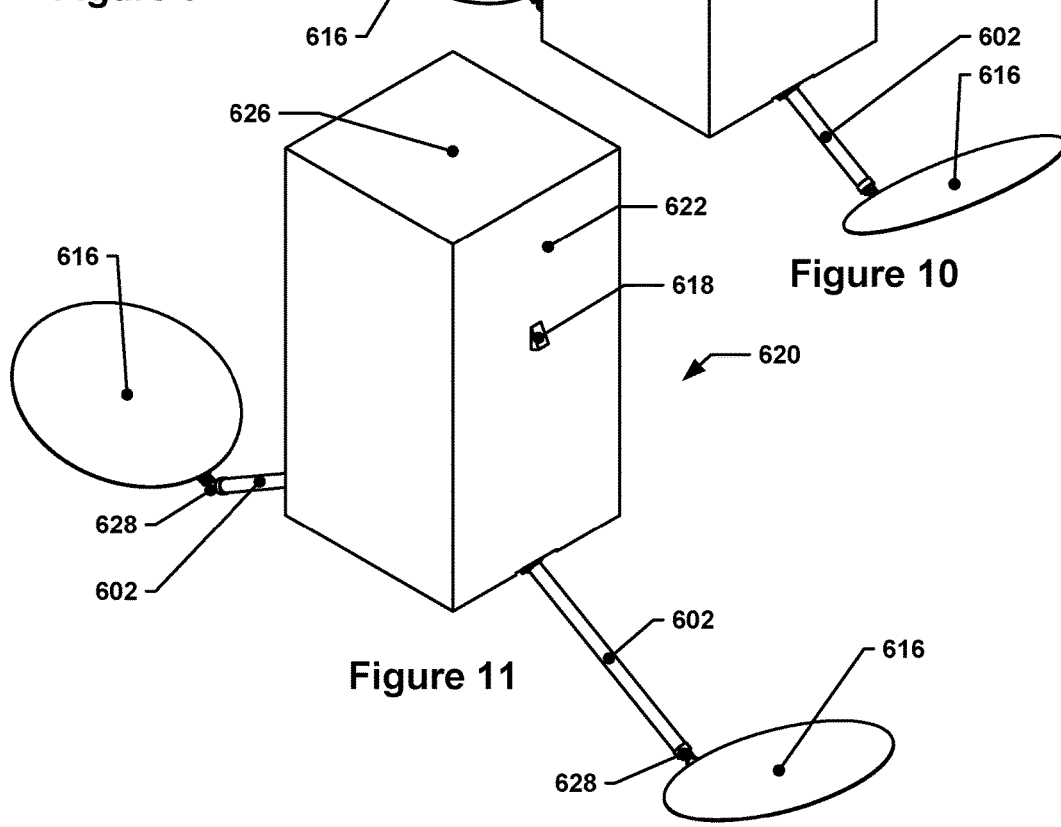
Figure 10
Figure 11

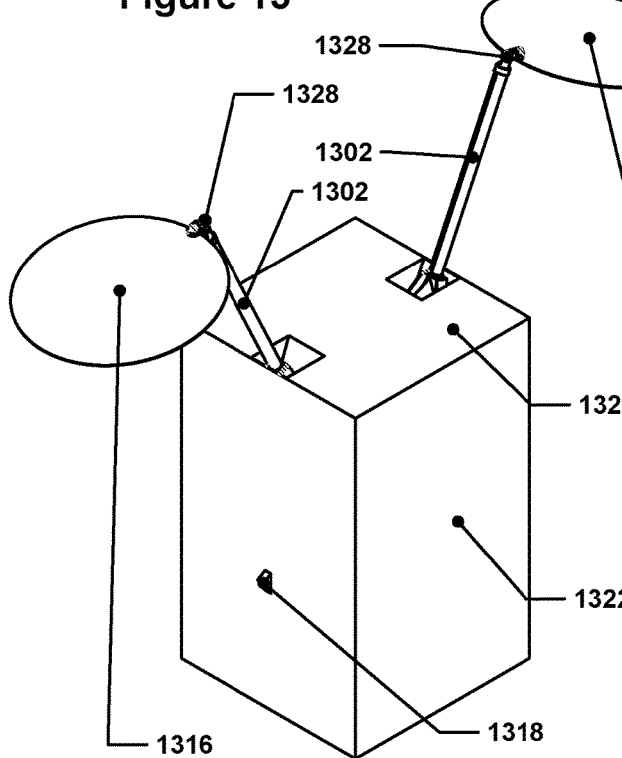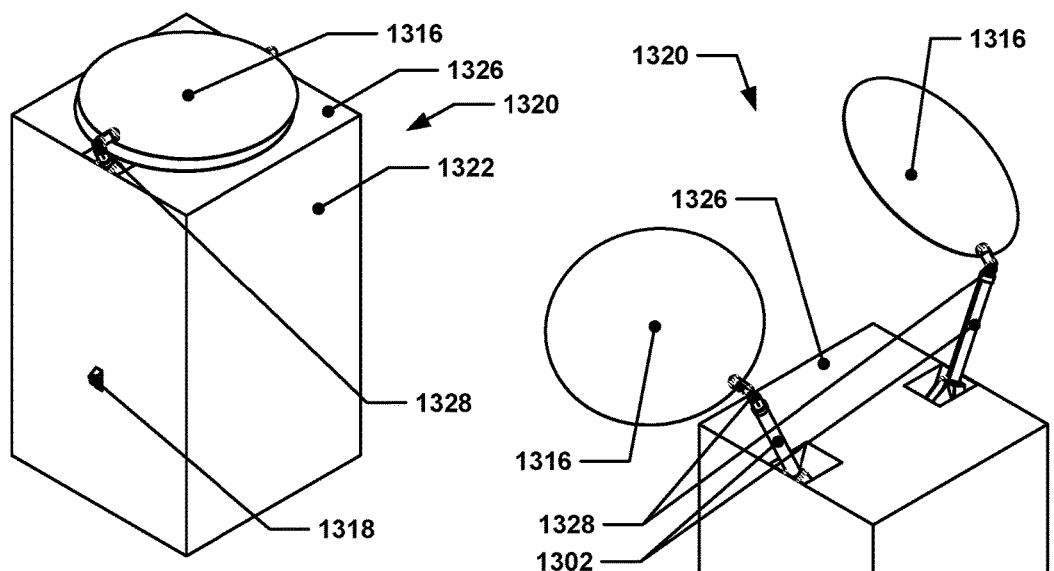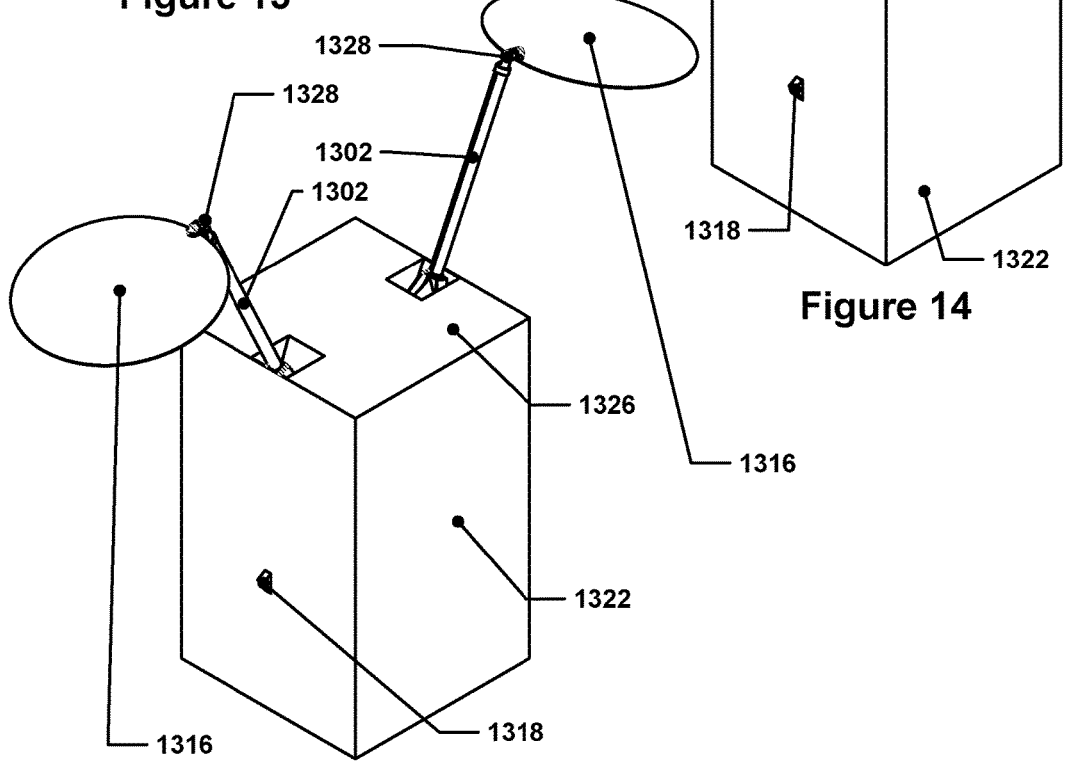
Figure 13
Figure 14
Figure 15

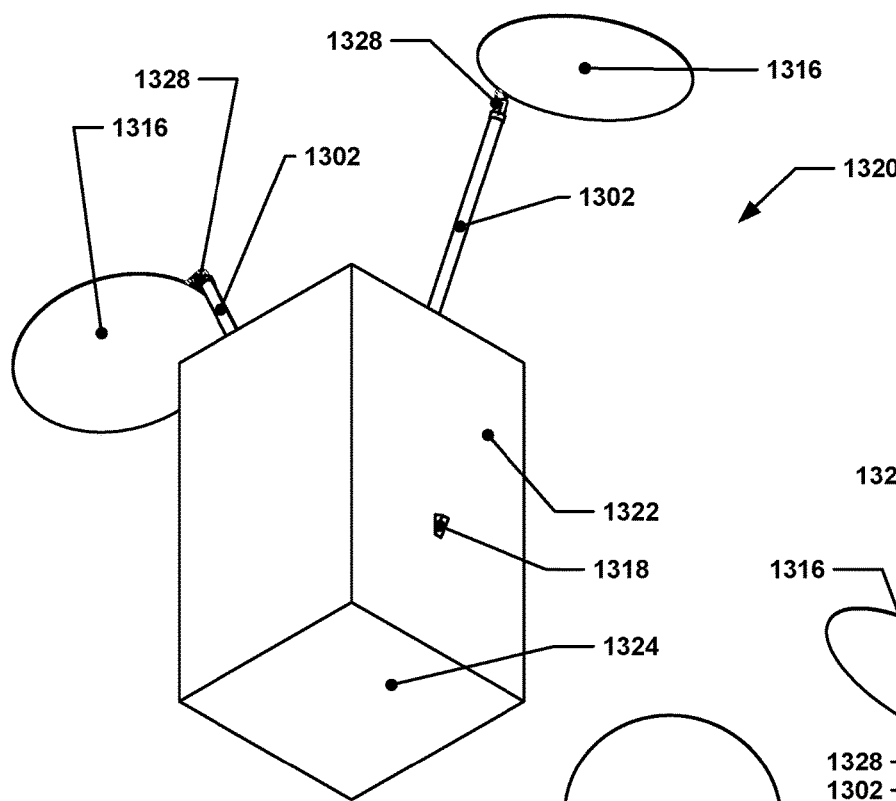
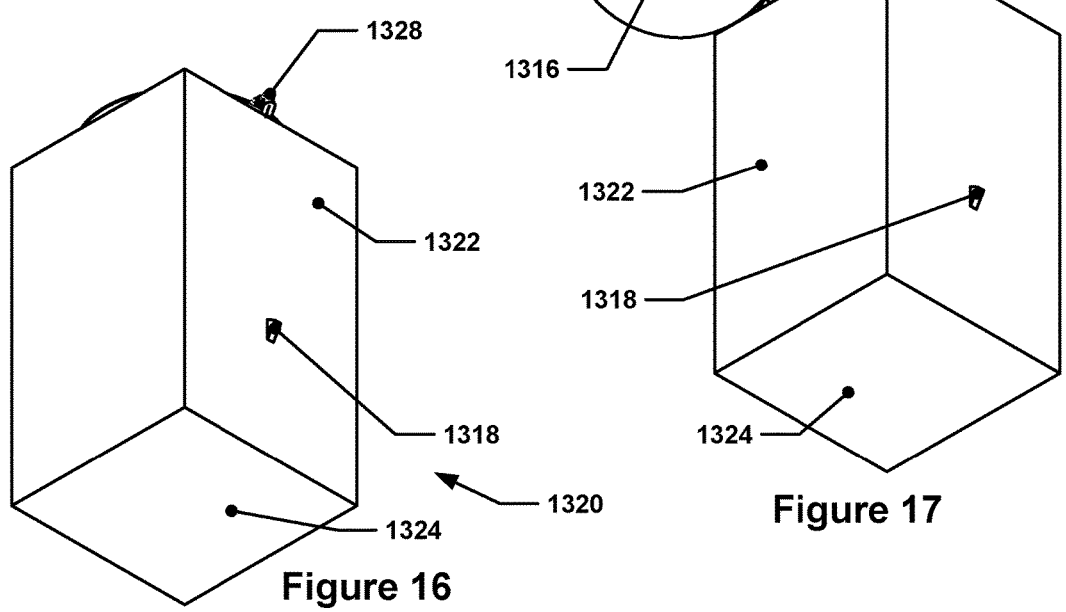
Figure 18
Figure 17
Figure 16

SPACECRAFT WITH RIGID ANTENNA REFLECTOR DEPLOYED VIA LINEAR EXTENSION BOOM

TECHNICAL FIELD

This disclosure relates generally to a spacecraft providing communications and/or broadcast service, and particularly to rigid antenna reflector packaging and deployment mechanisms for such a spacecraft.

BACKGROUND

The assignee of the present disclosure manufactures and deploys spacecraft for, inter alia, communications and broadcast services. Market demands for such spacecraft have imposed increasingly stringent requirements on spacecraft payload operational capacity. For example, rigid antenna reflector systems characterized by large reflector apertures and long focal lengths are increasingly needed to improve payload operational capacity.

Launch vehicle compatibility is a second requirement faced by a spacecraft designer. In order for a spacecraft to be delivered into orbit, it is necessary to package the spacecraft into a launch vehicle that provide the thrust and fuel necessary for the spacecraft to achieve orbital insertion. The increased performance requirements are only advantageously met if compatibility with conventional, commercially available launch vehicles is maintained, as developing new launch vehicles is prohibitively expensive. Accordingly, a spacecraft, as configured for launch, is desirably made compatible with the mass properties and fairing envelope constraints of such launch vehicles as, for example, Ariane, Atlas, Proton, Falcon, and Sea Launch.

In view of the foregoing, there is a need for a spacecraft capable of supporting higher-gain rigid antenna reflector systems while still fitting within the fairing envelopes of existing launch vehicles.

SUMMARY

The present inventor has appreciated that a rigid antenna reflector having a large focal length may be packaged on a spacecraft within a conventional launch vehicle fairing envelope through the use of a linear extension boom. Such a linear extension boom may be transitionable between a stowed configuration and a deployed configuration. In the stowed configuration, the linear extension boom may be retracted into a compact, relatively short unit, and the rigid antenna reflector connected with the linear extension boom may be positioned so as to be proximate to a surface of the spacecraft. In the deployed configuration, the linear extension boom may be extended so as to move the rigid antenna reflector some distance from the spacecraft and the rigid antenna reflector re-oriented such that it is oriented towards an antenna feed of the spacecraft. The linear extension boom may be able to controllably extend and retract along a linear axis, thereby allowing the focal distance between the antenna feed and the rigid antenna reflector to be at least somewhat decoupled from the angular orientation of the rigid antenna reflector relative to the antenna feed.

In some implementations, a spacecraft may be provided that includes a main body, a first antenna feed, a first rigid antenna reflector, and a first linear extension boom. The first linear extension boom may have a proximal end and a distal end, and the first linear extension boom may be configured to cause, when actuated, the distal end to translate along a first linear axis with respect to the proximal end. The first rigid antenna reflector may be coupled with the distal end of the first linear extension boom, and the proximal end of the first linear extension boom may be coupled with the main body. In such implementations, the first linear extension boom and the first rigid antenna reflector may be configured such that the first rigid antenna reflector and the first linear extension boom are transitionable from a first stowed configuration to a first deployed configuration. The first linear extension boom may have a first length in the first stowed configuration and a second length in the first deployed configuration, and the first rigid antenna reflector may be positioned a first distance from the main body in the first stowed configuration and a second distance from the main body in the first deployed configuration. The first length and the first distance may each be respectively less than the second length and the second distance, and the first rigid antenna reflector may illuminate the first antenna feed when in the first deployed configuration.

In some such implementations, the first rigid antenna reflector may move relative to the first antenna feed when the first linear extension boom is actuated.

In some further implementations, the proximal end of the first linear extension boom may be coupled with the main body by way of a rotational joint that is configured to allow the first linear extension boom to be rotated about a pivot axis relative to the main body.

In some implementations, the first linear extension boom may be a storable tubular extendible mast (STEM) that includes a tube having a long axis parallel to the first linear axis, a winding spool configured to rotate about a winding axis perpendicular to the first linear axis, a drive motor configured to rotate the winding spool, one or more guides configured to engage with an outer surface of the tube, and a support structure that supports the winding spool and the one or more guides in a spaced-apart manner. In such implementations, the tube may pass through the one or more guides, a first end of the tube may be flattened and a circumferential edge of the first end of the tube may be coupled with the winding spool and may be parallel to the winding axis, and the one or more guides, the tube, and the winding spool may be arranged such that when the winding spool is rotated in a first direction, the tube flattens out as it is drawn onto the winding spool and the distance between the winding spool and a second end of the tube opposite the first end decreases, and when the winding spool is rotated in a second direction opposite the first direction, the tube returns into a tubular shape as the tube unwinds from the winding spool and the distance between the winding spool and the second end increases. In some such implementations, the tube may have a slit along the long axis.

In some implementations of the spacecraft, the spacecraft may further include a positioning mechanism. In such implementations, the first rigid antenna reflector may be coupled with the distal end of the first linear extension boom via the positioning mechanism, and the positioning mechanism may be configured to adjust the angular orientation of the first rigid antenna reflector with respect to the first linear extension boom.

In some such implementations, the positioning mechanism may be a dual-axis positioning mechanism configured to adjust the angular orientation of the first rigid antenna reflector about two different rotational axes with respect to the first linear extension boom.

In some implementations of the spacecraft, the spacecraft may have a yaw axis that is oriented earthward when the spacecraft is on-orbit, and the first linear extension boom may be coupled with the main body such that the first linear axis forms an oblique angle with respect to the yaw axis. In some such implementations, the oblique angle may be between 20 and 45 degrees, inclusive.

In some implementations of the spacecraft, the spacecraft may be configured to be mounted in a launch vehicle for delivery to orbit, the main body may have a forward surface that is oriented away from an aft end of the launch vehicle when the spacecraft is mounted in the launch vehicle, and the spacecraft may be reconfigurable between a launch configuration, in which the first rigid antenna reflector and the first linear extension boom are in the first stowed configuration, and an on-orbit configuration, in which the first rigid antenna reflector and the first linear extension boom are in the first deployed configuration. In such implementations, the first rigid antenna reflector may be stowed forward of the forward surface of the main body when the spacecraft is in the launch configuration, and the first rigid antenna reflector may be located further forward of the forward surface when the spacecraft is in the on-orbit configuration than when the spacecraft is in the launch configuration.

In some such implementations, the spacecraft may be configured such that the forward surface is oriented in an anti-Earth direction when the spacecraft is on-orbit.

In some implementations of the spacecraft, the spacecraft may be configured to be mounted in a launch vehicle for delivery to orbit, the main body may have a forward surface that is oriented away from an aft end of the launch vehicle when the spacecraft is mounted in the launch vehicle and an aft surface that is oriented towards the aft end of the launch vehicle when the spacecraft is mounted in the launch vehicle, and the spacecraft may be reconfigurable between a launch configuration, in which the first rigid antenna reflector and the first linear extension boom are in the first stowed configuration, and an on-orbit configuration, in which the first rigid antenna reflector and the first linear extension boom are in the first deployed configuration. In such implementations, the first rigid antenna reflector may be stowed adjacent to a side of the main body of the spacecraft spanning between the forward surface of the main body and the aft surface of the main body when the spacecraft is in the launch configuration and the first rigid antenna reflector may be positioned further aft of the forward surface when the spacecraft is in the on-orbit configuration than when the spacecraft is in the launch configuration.

In some such implementations, the spacecraft may be configured such that the forward surface is oriented earthward when the spacecraft is on-orbit.

In some implementations of the spacecraft, the spacecraft may include a second antenna feed, which may also be referred to herein as a third antenna feed. In such implementations, the first linear extension boom and the first rigid antenna reflector may be further configured such that the first rigid antenna reflector and the first linear extension boom are transitionable to a secondary first deployed configuration. The first linear extension boom may have a third length, also referred to herein as a secondary second length in the secondary first deployed configuration, and the first rigid antenna reflector may be positioned a third distance, also referred to herein as a secondary second distance, from the main body in the secondary first deployed configuration. The first length and the first distance may each be respectively less than the third length and the third distance, and the first rigid antenna reflector may illuminate the second antenna feed when in the secondary first deployed configuration.

In some implementations of the spacecraft, the spacecraft may include a second antenna feed, a second rigid antenna reflector, and a second linear extension boom. The second linear extension boom may have a proximal end and a distal end, and the second linear extension boom may be configured to cause, when actuated, the distal end to translate along a second linear axis with respect to the proximal end. The second rigid antenna reflector may be coupled with the distal end of the second linear extension boom, and the proximal end of the second linear extension boom may be coupled with the main body. The second linear extension boom and the second rigid antenna reflector may be configured such that the second rigid antenna reflector and the second linear extension boom are transitionable from a second stowed configuration to a second deployed configuration, and the second linear extension boom may have a third length in the second stowed configuration and a fourth length in the second deployed configuration. In such implementations, the second rigid antenna reflector may be positioned a third distance from the main body in the second stowed configuration and a fourth distance from the main body in the second deployed configuration, the third length and the third distance may each be respectively less than the fourth length and the fourth distance, and the second rigid antenna reflector may illuminate the second antenna feed when in the second deployed configuration.

In some such implementations, the first antenna feed and the second antenna feed may be located on opposite sides of the main body.

These and other implementations are discussed in more detail in the following description and accompanying drawings.

BRIEF DESCRIPTION OF THE DRAWINGS

The included drawings are for illustrative purposes and serve only to provide examples of possible structures for the concepts disclosed herein. These drawings in no way limit any changes in form and detail that may be made by one skilled in the art without departing from the spirit and scope of the disclosed embodiments.

FIGS. 3 through 5 depict isometric views of an example linear extension boom.

FIGS. 9-11 depict the example spacecraft of FIGS. 6-8 from a reverse isometric perspective during corresponding stages of boom deployment.

FIGS. 13-15 depict isometric views of various stages of rigid antenna reflector deployment for an alternate example implementation of a spacecraft in which the rigid antenna reflectors may be stowed forward of the forward surface.

FIGS. 16-18 depict reverse isometric views of the spacecraft of FIGS. 13-15 in corresponding stages of deployment.

Figure 1:
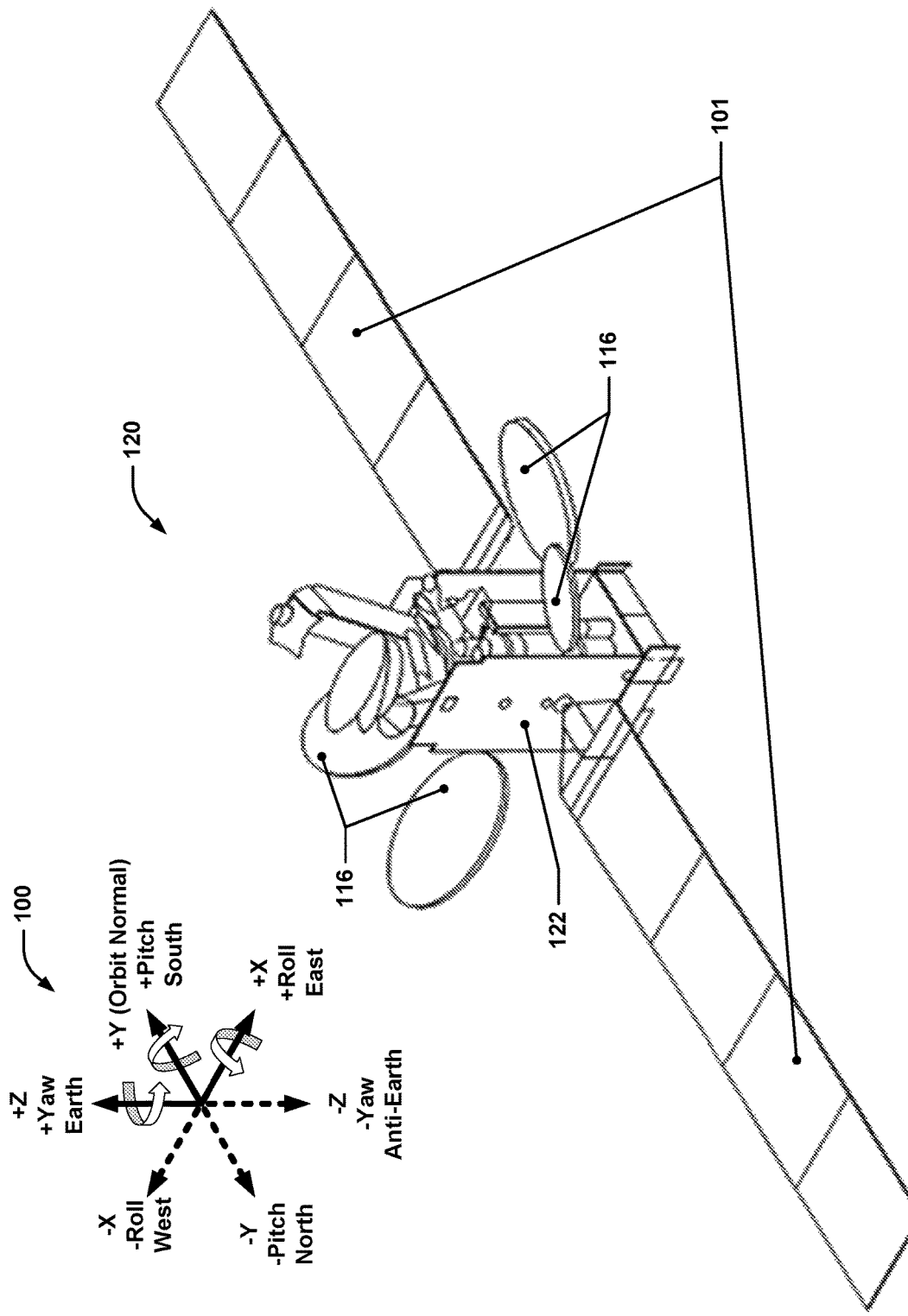
FIG. 1 depicts an isometric view of a generic spacecraft showing major components as well as a reference coordinate system.

Throughout the drawings, the same reference numerals and characters, or reference numbers sharing the same last two digits, unless otherwise stated or suggested by the text or Figures, are used to denote like features, elements, components, or portions of the illustrated embodiments. Moreover, while the subject concepts will now be described in detail with reference to the drawings, the description is done in connection with the illustrative embodiments. It is intended that changes and modifications can be made to the described embodiments without departing from the true scope and spirit of the disclosed subject matter, as defined by the appended claims.

DETAILED DESCRIPTION

Specific exemplary embodiments of the concepts disclosed herein will now be described with reference to the accompanying drawings. These concepts may, however, be embodied in many different forms, and should not be construed as limited to the embodiments set forth herein. Rather, these embodiments are provided so that this disclosure will be thorough and complete, and will fully convey the scope of the disclosure to those skilled in the art.

It will be understood that when an element is referred to as being "connected" or "coupled" to another element, it can be directly connected or coupled to the other element, or intervening elements may be present; the term "coupled" may also refer to two elements that are coupled via a contiguous structure, e.g., a single, molded part may have a "tab" that is coupled with a "body." Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The terms "spacecraft", "satellite" may be used interchangeably herein, and generally refer to any satellite or spacecraft system designed to be placed in orbit around the Earth or other celestial body.

The term "main body" as used herein, unless otherwise expressly indicated, refers to the nominal major structure of the spacecraft. The main body typically contains the internal payload and bus equipment of the spacecraft and provides structural mounting locations for various external elements, such as solar panels, antenna reflectors, thermal management elements, antenna feeds, launch vehicle mating interfaces, equipment modules, etc.

The term "boom," as used herein, refers to a long, generally thin, beam-like structure that is used to support a piece of equipment, e.g., an antenna reflector, at some distance from another body, e.g., the main body.

The term "aft surface" as used herein with respect to the main body, unless otherwise expressly indicated, refers to the major surface of a spacecraft main body which is aftmost when the spacecraft is in the stowed or launch configuration on a launch vehicle. Aft is defined as being opposite the direction of travel of the launch vehicle. There may be other surfaces which are further aft of the aft surface, such as surfaces on a launch vehicle mating interface, but these are typically much smaller surfaces. The aft surface may be substantially planar, or may be contoured or possess other minor features.

The term "forward surface" as used herein, unless otherwise expressly indicated, refers to the major surface of a spacecraft main body which is foremost when the spacecraft is in the stowed or launch configuration on the launch vehicle. Forward, in this context, is defined as being in the direction of travel of the launch vehicle. It is to be understood that the term "forward surface" does not refer to structures which are movable with respect to the main body, e.g., repositionable antenna reflectors.

Spacecraft or satellites are typically described with respect to a reference spacecraft body coordinate frame. A better understanding of the reference coordinate frames used to describe spacecraft or satellites may be obtained by referring to FIGS. 1 and 2, wherein an Earth-pointing three axis stabilized satellite or spacecraft 120 is illustrated with respect to a reference spacecraft body coordinate frame 100 having roll (x), pitch (y), and yaw (z) axes. Conventionally, the yaw axis is defined as being directed along a line intersecting the center of mass of the Earth or other body 142 about which the spacecraft orbits; the roll axis is defined as being perpendicular to the yaw axis, lying in the plane of the orbit in the direction of the spacecraft velocity vector; and the pitch axis (y), normal to the orbit plane, completes a three-axis, right-hand orthogonal system. Satellite or spacecraft 120 has a main body 122 substantially in the form of a rectangular cuboid, although satellites or spacecraft may, in actual practice, have other shapes, such as prismatic octagonal volumes or cylindrical volumes. In such embodiments, the satellite or spacecraft may have curved sides or otherwise depart from a true rectangular cuboid. In such embodiments, terms east, west, north, and south may still be used to refer to portions of the satellite or spacecraft which generally face in those directions when the satellite or spacecraft is on-orbit.

Figure 2:
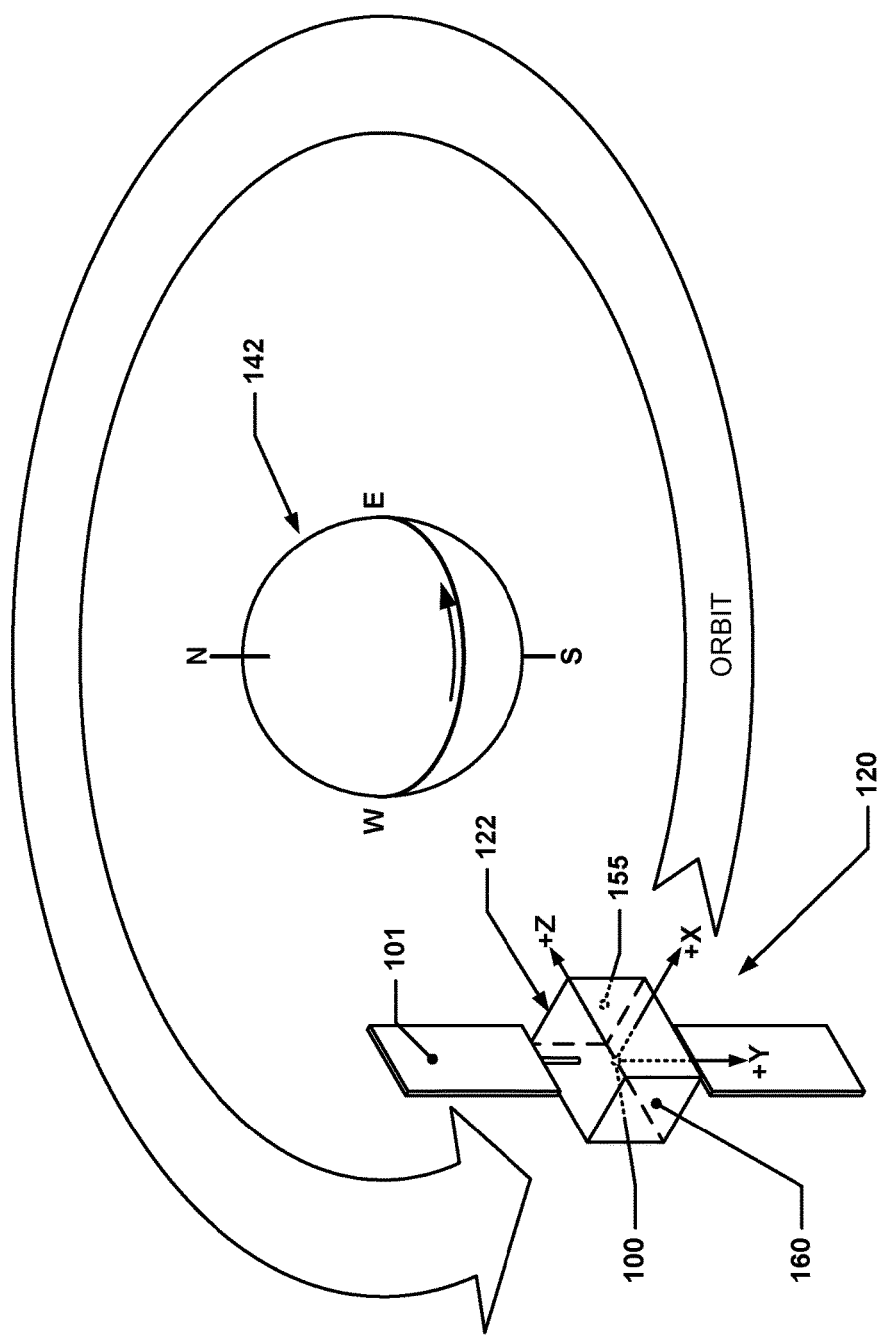
FIG. 2 depicts a simplified diagram showing a generic spacecraft in orbit about a planet.

Referring to FIG. 2, satellite or spacecraft 120 may also include Earth deck 155 and anti-Earth deck 160. Conventionally, Earth deck 155 is nominally orthogonal to the z axis and facing earthwards or towards whatever body 142 the satellite or spacecraft orbits; anti-Earth deck 160 is also nominally orthogonal to the z axis, but facing away from the Earth. Earth deck 155 or anti-Earth deck 160 may have additional separately attached or integrated structures which extend away from either deck. In some embodiments, Earth deck 155 may correspond with the forward surface, and anti-Earth deck 160 may correspond with the aft surface. In some other embodiments, which may be referred to as "inverted" satellite or spacecraft configurations, Earth deck 155 may correspond with the aft surface, and anti-Earth deck 160 may correspond with the forward surface. Many spacecraft or satellites include solar panels, such as solar panels 101, that are typically extended from sides of the spacecraft or satellites that are oriented north or south when the spacecraft is in orbit, e.g., extending along the pitch axis. It is also common for satellites or spacecraft to include antenna reflectors, such as antenna reflectors 116.

The terms "outboard" and "inboard" as used herein, unless otherwise indicated, refer to relationships between one element/portion and another element/portion based on their distances from the yaw axis of a satellite or spacecraft. For example, if most of component A is located a further perpendicular distance from the yaw axis than most of component B, component A may be said to be "outboard" of component B. Similarly, component B may be said to be "inboard" of component A. There may be some portions of component A which are closer to the yaw axis than some portions of component B, but it will be understood that component A may nonetheless still be substantially outboard of component B.

Spacecraft or satellites may include one or more antenna systems designed to communicate with distant targets, such as locations on Earth. An antenna system may include, for example, an antenna reflector illuminated by a radio-frequency feed (RF feed). Such an antenna reflector may, for example, be an on-axis or off-axis parabolic antenna reflector.

Antenna reflectors may be either furlable or rigid structures. Furlable antenna reflectors are typically, when unfurled, substantially larger in diameter than the launch vehicle fairing, and are therefore required to be "furled" into a much smaller launch configuration volume.

By way of contrast, rigid antenna reflectors are not designed to unfurl, and cannot be placed into a stowed configuration which is much smaller in volume compared to the operational configuration. Instead, they are constructed to maintain their overall shape during stowage, launch, deployment, and on-orbit use. A rigid antenna reflector may be capable of flexing and otherwise deforming in minor ways, however the overall shape of a rigid antenna reflector will stay the same. Rigid antenna reflectors are often mounted to mechanisms which are attached to a main body of a spacecraft and which fold the antenna reflector against the side panel in the launch configuration. Spacecraft 120 shown in FIG. 1 includes two side-mounted rigid antenna reflectors on one side which fold against that side and two side-mounted rigid antenna reflectors on the opposing side which fold against that opposing side. The implementations discussed herein are directed at rigid antenna reflector deployment systems.

The present inventor has determined that a rigid antenna reflector may be supported relative to a spacecraft main body using a particular type of boom, referred to herein as a "linear extension boom." A linear extension boom, as the term is used herein, refers to a storable tubular extendible mast (STEM). In a STEM, the boom is a tubular structure made out of a resilient, relatively thin-wall material. One end of the tubular structure may be connected with a reel or winding spool; when the winding spool is rotated so as to wind the tubular structure onto the winding spool, the tubular structure may collapse flat as it is wound onto the winding spool. At the same time, one or more guides may interact with the outer surfaces of an unwound portion of the tubular structure to prevent the unwound portion of the tubular structure from collapsing as well. STEMs may be actively powered, e.g., with a motor driving the winding spool, or passively powered, e.g., using a spring-driven actuator of some sort. Actively-powered STEMs may be actuated, e.g., extended or retracted, by rotating the winding spool in different directions.

STEMs have traditionally been used in applications where a very long boom length is needed without incurring an unnecessary weight penalty. For example, when a boom is needed that is many times longer than the length of the spacecraft to which it is mounted, a fixed-length boom solution may require multiple fixed-length booms joined together by hinged connections. Each of these hinged connections may require some form of motor or passive deployment mechanism in order to cause the fixed length booms to unfold during deployment; this additional hardware incurs additional monetary and payload mass cost, and introduces additional system complexity that increases the potential for a system failure. STEMs may be used in place of such articulated booms since they may achieve a comparable length, e.g., multiple times the length of the spacecraft main body, without requiring any hinged connections. However, such STEMs, by virtue of their length, are typically quite flexible, e.g., having natural frequencies on the order of 0.1 Hz or less. Thus, STEMs are conventionally thought of as being useful for applications in which large extended lengths, e.g., several tens of meters, and low stiffness, e.g., less than 0.1 Hz, are required and/or acceptable. Solar panel arrays, for example, are generally not sensitive to flexure and are, in the deployed state, often multiple spacecraft main body lengths in size—STEMs may thus be conventionally viewed as being well-suited to being used in a deployable solar array.

The present inventor has determined, however, that relatively short STEMs, e.g., STEMs that are less than about 2 spacecraft body lengths when fully extended, may be used to support rigid antenna reflectors. In particular, linear extension booms with a length-to-diameter ratio in the range of 10 to 20 may be particularly suitable for supporting rigid antenna reflectors in implementations such as those discussed herein.

Rigid antenna reflectors are typically supported on fixed-length, pivoting booms that firmly locate the rigid antenna reflector in space relative to an antenna feed. As the relative positioning between a rigid antenna reflector and its corresponding antenna feed may have a significant impact on the performance of the rigid antenna reflector/antenna feed system, such pivoting booms are often much stiffer than is achievable using a conventional STEM. A short STEM, however, may, through its reduced length and, if necessary, through appropriate selection of STEM diameter, STEM material, mass at the tip of the STEM, and other parameters, achieve a much higher stiffness than may be achieved with conventional, long-length STEMs. For example, a STEM with a 6.25" outer diameter and a 105" length may be able to achieve a natural frequency of 0.53 Hz, which may be stiff enough for use with some rigid antenna reflector systems. Additional stiffness may be realized through adjusting the outer diameter of the STEM, the tip mass, or other parameters of the system.

There are several advantages to supporting a rigid antenna reflector on a linear extension boom, e.g., using a STEM. For example, the length of an active linear extension boom may be adjusted in order to more precisely focus the rigid antenna reflector's illumination pattern on a target, such as on the antenna feed of the spacecraft. A related benefit is that the length of the linear extension boom may be adjusted to allow the rigid antenna reflector to be focused on a completely different component from the antenna feed, such as on a secondary or alternate antenna feed. Thus, for example, if one antenna feed fails, the rigid antenna reflector may be re-focused on a back-up antenna feed. While the rigid antenna reflector could be re-oriented to illuminate such a secondary antenna feed without adjusting the linear extension boom, the focal characteristics of many rigid antenna reflectors are such that the resulting illumination pattern may be centered on the secondary antenna feed but also be defocused as compared to the illumination pattern on the original antenna feed. Another benefit that arises from using a linear extension boom is that it may be possible to position a rigid antenna reflector at a much further distance outboard of the spacecraft main body during deployment of the rigid antenna reflector than may be possible using other types of booms, such as hinged booms; this may allow for longer focal-length rigid antenna reflectors to be used.

FIGS. 3 through 5 depict an example linear extension boom. As seen in FIG. 3, a linear extension boom 302 is depicted in a retracted state. The linear extension boom 302 may include a winding spool 303, a drive motor 310, a support structure 304, and a guide 312. The support structure 304 may be configured to support the winding spool 303 relative to the guide 312, e.g., in a spaced-apart manner. The drive motor 310 may be configured to rotate the winding spool 303 about a winding axis 307. In this example linear extension boom 302, the boom may also include a slit-tube structure; this tube 314 is only partially visible in FIG. 3, although it is more visible in FIGS. 4 and 5. The tube 314 may be manufactured such that it retains its tubular shape while in an unstressed state, but may, through the application of force, be unrolled and flattened for at least a portion of its length. Thus, the guide 312 may counteract any forces that are exerted upon the tube 314 within the region between the winding spool 303 and the guide 312, which may cause the remaining portion of the tube 314 that extends away from the guide 312 in the direction of a linear axis 305 to retain its tubular cross-sectional shape.

The tube 314 may have a first end that is connected with the winding spool 303; the first end may be unrolled and flattened out such that, for example, a circumferential edge of the tube 314 at the first end is parallel with the winding axis 307 and is connected with the winding spool 303. Thus, when the winding spool 303 is rotated by the drive motor 310 about the winding axis 307, the tube 314 may be wound onto the winding spool 303. Thus, as the tube 314 is wound onto the winding spool 303, the stressed imposed on the tube 314 may cause the tube 314 to flatten out in a flattening region 308 between the guide 312 and the winding spool 303, allowing the tube 314 to be compactly wound on the winding spool 303, thereby shortening the length of the unflattened portion of the tube 314.

In FIG. 3, the tube 314 has been completely wound onto the winding spool 303 (aside from the portion in the flattening region 308 between the winding spool 303 and the guide 312), leaving the linear extension boom in a retracted state. A mount 306 located at a second end of the tube 314 opposite the first end may connect the tube 314 with, for example, a rigid antenna reflector (not shown), either directly or via some intermediary component or components, such as a single- or dual-axis antenna positioning mechanism. The positioning mechanism may, for example, have electronics (sensors, drive motors, etc.) that are supplied power by way of a cable. The cable may be routed external to the tube 314 or may be fed into the interior of the tube 314 in the flattening region 308, i.e., after the flattened portion of the tube 314 has been unwound from the winding spool 303 and before the tube 314 has passed through the guide(s) 312 to form the tubular cross-section. In the latter case, the mount 306 may include electrical connectors or other features that allow the cable to communicate with the positioning mechanism (or with other equipment that may require electrical connectivity).

As can be seen in FIG. 4, when the winding spool 303 is rotated about the winding axis 307 by the drive motor 310, the flattened portion of the tube 314 that unrolls from the winding spool 303 may, due to the stiffness of the tube 314 in the flattening region 308, be guided through the guide 312, which may then guide the flattened portions of the tube 314 back into the tubular cross-section that the tube 314 has between the guide 312 and the mount 306. This causes the second end of the tube 314 and the mount 306 to translate away from the winding spool 303 and the support structure 304 along the linear axis 305.

In FIG. 5, the entire length of the tube 314 has been unwound from the winding spool 303, and the linear extension boom 302 is fully extended. If desired, the drive motor 310 may be engaged to reverse the unwinding process, which may cause the linear extension boom 302 to retract and the tube 314 to be partially or entirely re-wound on the winding spool 303. The drive motor 310 may be controlled to wind or unwind the winding spool any desired amount to allow the linear extension boom to be adjusted to any length in between the fully retracted length and the fully extended length. Generally speaking, the linear extension boom may have a first length in the stowed configuration that results in the rigid antenna reflector being positioned a first distance from the yaw axis of the spacecraft, e.g., such as in a position where the rigid antenna reflector may be stowed against a side of the spacecraft or the forward surface of the spacecraft for placement in a launch vehicle, and at least a second length in the deployed configuration such that the rigid antenna reflector may be positioned a second distance from the yaw axis of the spacecraft and oriented to illuminate the antenna feed, as may be used when the spacecraft is on-orbit; the first length and the first distance may be less than the second length and the second distance, respectively. Linear extension booms may also be further extended to have a third length (or any other number of desired lengths) so as to position the rigid antenna reflector a third distance (or any other number of desired distances) from the spacecraft, as may be useful when it is necessary to re-focus the rigid antenna reflector on a different target point, e.g., on a different antenna feed or on a different remote target, such as a different earthbound receiver/transmitter; the third length and the third distance (and other additional lengths and distances) may also be greater than the first length and distance, respectively. These additional extended lengths and rigid antenna reflector/antenna feed distances may be associated with one or more secondary or auxiliary deployed configurations of the linear extension boom, i.e., the linear extension boom may be considered to be in a deployed configuration, in some instances, when extended to a range of potential lengths that encompass configurations in which the rigid antenna reflector and the antenna feed are arranged in an operable manner with respect to one another.

The example linear extension boom of FIGS. 3 through 5 is a STEM boom that features a tube 314 with a C-shaped cross section (or, perhaps more accurately, a round cross section with a small gap at one radial location). Other types of STEM booms that may be used include STEM booms where the tube is formed by two separate layers of material that interlock with one another, or where one layer forms a C-shaped tube and the other layer forms a D-shaped tube nestled within the C-shaped tube. Some STEM booms may include additional features, such as interlocking edge features along the longitudinal slit in the tube that interlock with each other when the tube is extended and prevent the edges of the slit from moving relative to one another along the linear axis, which may make the tube stronger in buckling. Other STEM booms may feature a tube that has a continuous outer perimeter (as opposed to having one or more longitudinal slits in it); such tubes may be made by welding two semicircular cross-section tubes having radial flanges along both long edges together such that a tube with opposing radial flanges is formed; such a tube may be flattened by compressing the tube in directions perpendicular to the flanges and then wound around a winding spool. All of these types of STEM, as well as other STEMs not specifically mentioned here, are considered to be within the scope of this disclosure and may be used in the implementations discussed herein.

Figure 6:
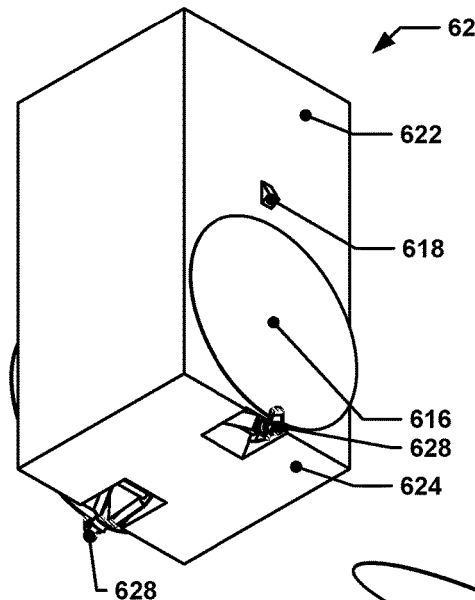
FIGS. 6-8 depict isometric views of an example spacecraft with rigid antenna reflectors deployable by linear extension booms during various stages of boom deployment.
Figure 7:
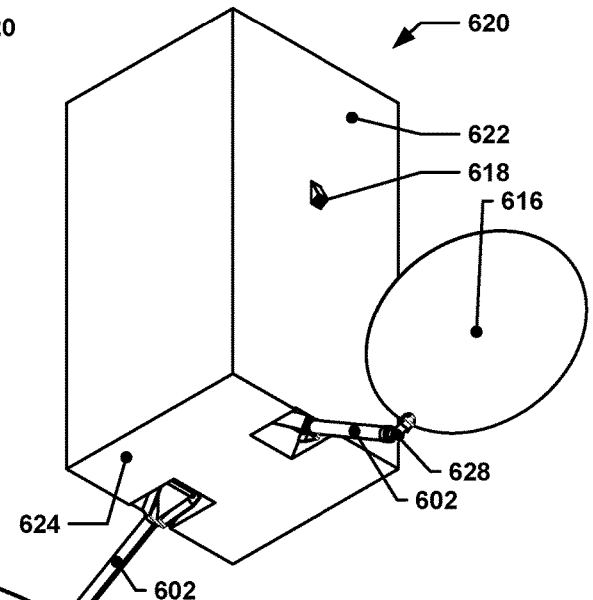
Figure 8:
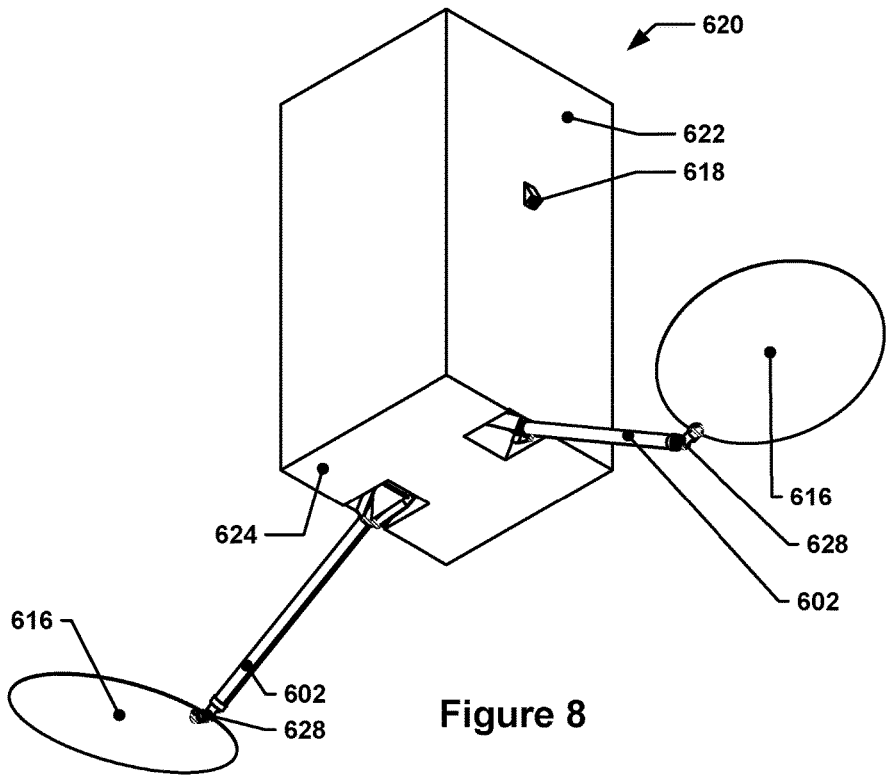

FIGS. 6 through 11 depict an example spacecraft with rigid antenna reflectors deployable by linear extension booms. FIGS. 6 through 8 depict the example spacecraft from an isometric perspective in various stages of rigid antenna reflector deployment, and FIGS. 9 through 11 depict the example spacecraft from a reverse isometric perspective during those stages of deployment.

In FIGS. 6 and 9, a spacecraft 620 is shown in a launch configuration; in this configuration, rigid antenna reflectors 616 are stowed against the sides of a main body 622 of the spacecraft 620, and linear extension booms 602 (not labeled in FIGS. 6 and 9, but labeled in FIGS. 7, 8, 10, and 11) are fully-retracted. Thus, the linear extension booms 602 and the rigid antenna reflectors 616 may be in a stowed configuration. The linear extension booms 602 in this implementation each include a positioning mechanism 628 that connects the distal ends of the linear extension booms 602 with one of the rigid antenna reflectors 616. A proximal end of each linear extension boom 602 is connected with the main body 622. In the depicted implementation, the linear extension booms 602 are nestled into recesses in an aft surface 624 of the main body 622. The positioning mechanisms 628 may include one or more rotational joints that allow the orientation of the rigid antenna reflectors 616 relative to the linear extension booms 602 to be adjusted or modified. The spacecraft may also have an antenna feed 618 that is designed to receive RF energy from the rigid antenna reflector 616, transmit RF energy towards the rigid antenna reflector, or both (when the rigid antenna reflector 616 is deployed). The spacecraft may also include one or more releasable hold-downs that may help support the rigid antenna reflector during launch accelerations; such hold-downs may be configured to be released once the rigid antenna reflectors are to be deployed.

The spacecraft 620 may include various other systems which are not depicted, such as solar panels, maneuvering systems, heat dissipation systems, etc.

As can be seen in FIGS. 7 and 10, during deployment, the linear extension booms 602 are extended and the rigid antenna reflectors 616 may be rotated using the positioning mechanisms 628; upon full deployment, as shown in FIGS. 9 and 11, the rigid antenna reflectors 616 may be oriented such that they each illuminate a different antenna feed 618. In this example, the forward surface 626 (visible in FIGS. 9 through 11), is oriented earthwards when the spacecraft 620 is on-orbit, and the rigid antenna reflectors may redirect and focus RF energy from the antenna feeds 618 to a ground-based receiver and/or may redirect and focus RF energy from a ground-based transmitter to the antenna feeds 618.

Figure 12:
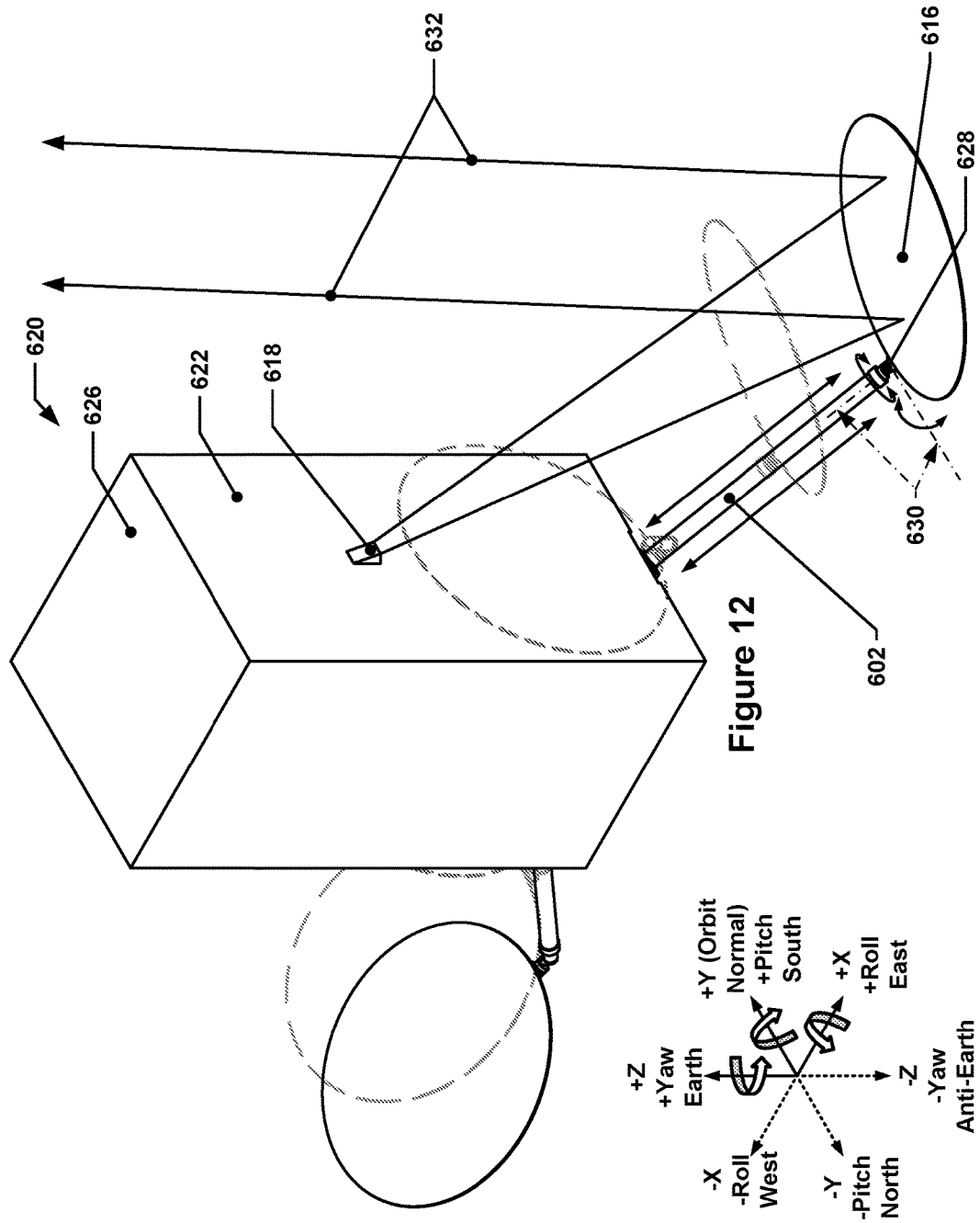
FIG. 12 depicts the example spacecraft implementation of FIGS. 6-11.

FIG. 12 depicts the implementation of FIGS. 6 through 11. The spacecraft 620, as can be seen, is in the on-orbit configuration, and the rigid antenna reflectors 616 and linear extension booms 602 are in the deployed configuration. FIG. 12 also depicts, using broken or dashed lines, the positioning of the rigid antenna reflectors 616 and the linear extension booms 602 when in the stowed configuration and midway through deployment. As can be seen, the rigid antenna reflectors 616 may reflect beam paths 632 such that they focus on the antenna feed 618 or reflect beam paths radiating outwards from the antenna feed such that they are focused and redirected towards a ground-based receiver.

FIGS. 13 through 18 depict an alternate implementation of a spacecraft in which the rigid antenna reflectors may be stowed forward of the forward surface. FIGS. 13 through 15 depict isometric views of such a spacecraft during various stages of deployment, and FIGS. 16 through 18 depict reverse isometric views of the spacecraft in equivalent stages of deployment.

As can be seen, FIGS. 13 through 18 depict a spacecraft 1320 that includes a main body 1322, two linear extension booms 1302, and two rigid antenna reflectors 1316. Each rigid antenna reflector 1316 is connected with a corresponding one of the linear extension booms 1302 by way of a positioning mechanism 1328.

In FIGS. 13 and 16, the linear extension booms 1302 are in a fully retracted or stowed configuration, and the rigid antenna reflectors 1316 have been rotated, by way of the positioning mechanisms 1328, such that the rigid antenna reflectors 1316 are positioned forward of forward surface 1326 and generally parallel to the forward surface 1326 (the rigid antenna reflectors 1316 are dish-shaped and are thus not literally parallel to the forward surface 1326, but may still be regarded as generally parallel thereto). In this configuration, the spacecraft may be thought of as being in a launch configuration, e.g., ready for installation into a launch vehicle fairing or shroud. When installed, an aft surface 1324 of the spacecraft 1320, which is located opposite the forward surface 1326, may interface with interface mechanisms of the launch vehicle.

In FIGS. 14 and 17, the linear extension booms 1302 are partially extended, and the rigid antenna reflectors 1316 have been rotated partially out of their positions in the stowed/launch configuration by the positioning mechanisms 1328.

In FIGS. 15 and 18, the linear extension booms 1302 are more fully or fully extended, i.e., in a deployed configuration, and the rigid antenna reflectors 1316 have been rotated by the positioning mechanisms 1328 such that they are oriented towards antenna feeds 1318 (only one antenna feed is shown, but a corresponding antenna feed 1318 is located on the opposite side of the spacecraft 1320 from the depicted antenna feed 1318). The spacecraft of FIGS. 15 and 18 may be thought of as being in an on-orbit configuration under such circumstances.

Figure 19:
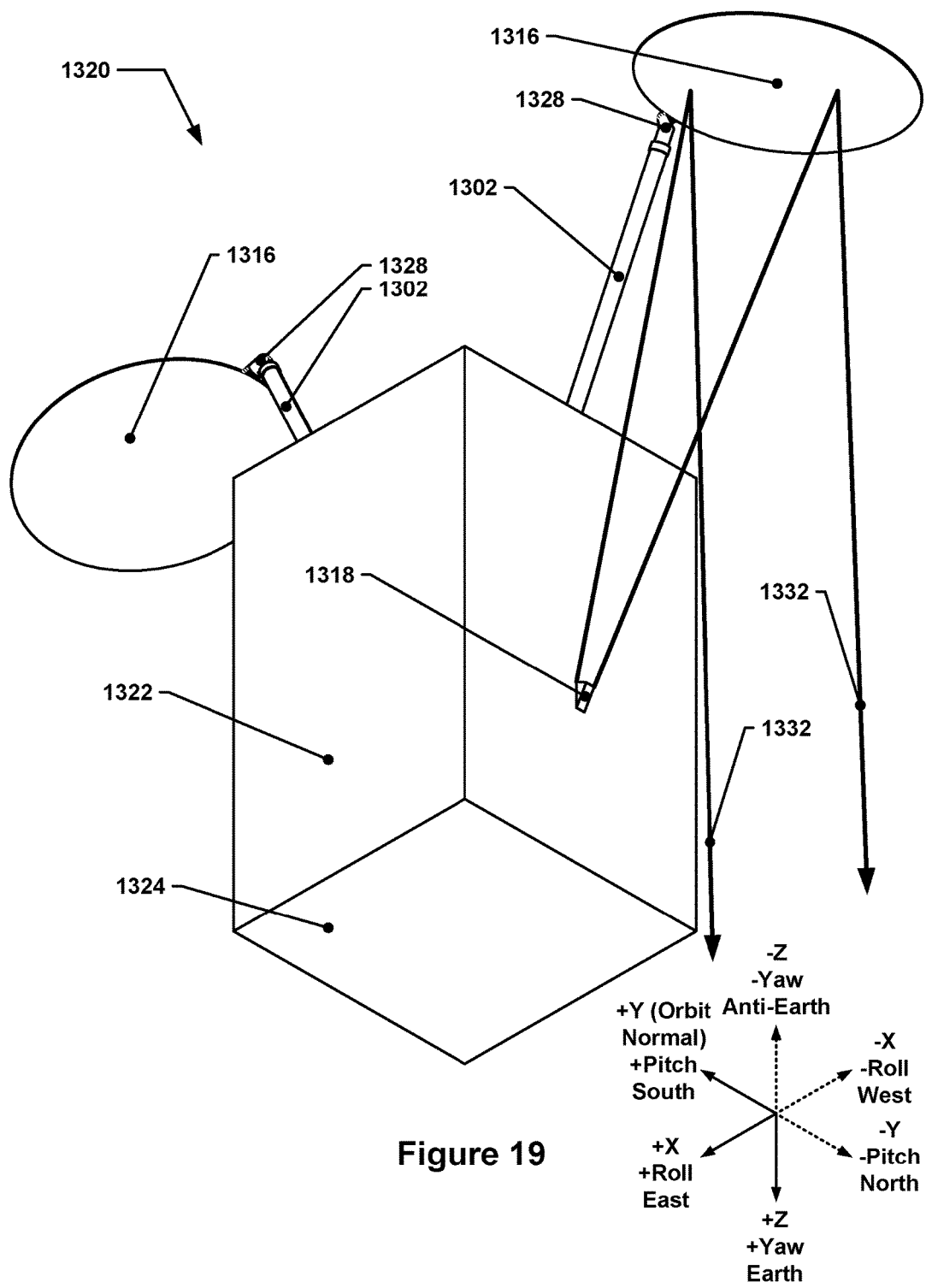
FIG. 19 depicts the example spacecraft implementation of FIGS. 13-18.

FIG. 19 depicts the example spacecraft implementation of FIGS. 13-18 in the deployed configuration. As can be seen, the spacecraft 1320 is in the on-orbit configuration and the rigid antenna reflectors 1316 are located further forward of the forward surface as compared with their locations in the launch configuration. Also of note is the orientation of the forward surface 1326 and the aft surface 1324. In contrast to the implementation shown in FIG. 12, the aft surface 1324 is oriented earthwards, and the forward surface 1326 is oriented in the anti-Earth direction. As can be seen, the rigid antenna reflectors 1316 may reflect beam paths 1332 such that they focus on the antenna feed 1318 or reflect beam paths radiating outwards from the antenna feed 1318 such that they are focused and redirected towards a ground-based receiver.

Figures 20, 21:
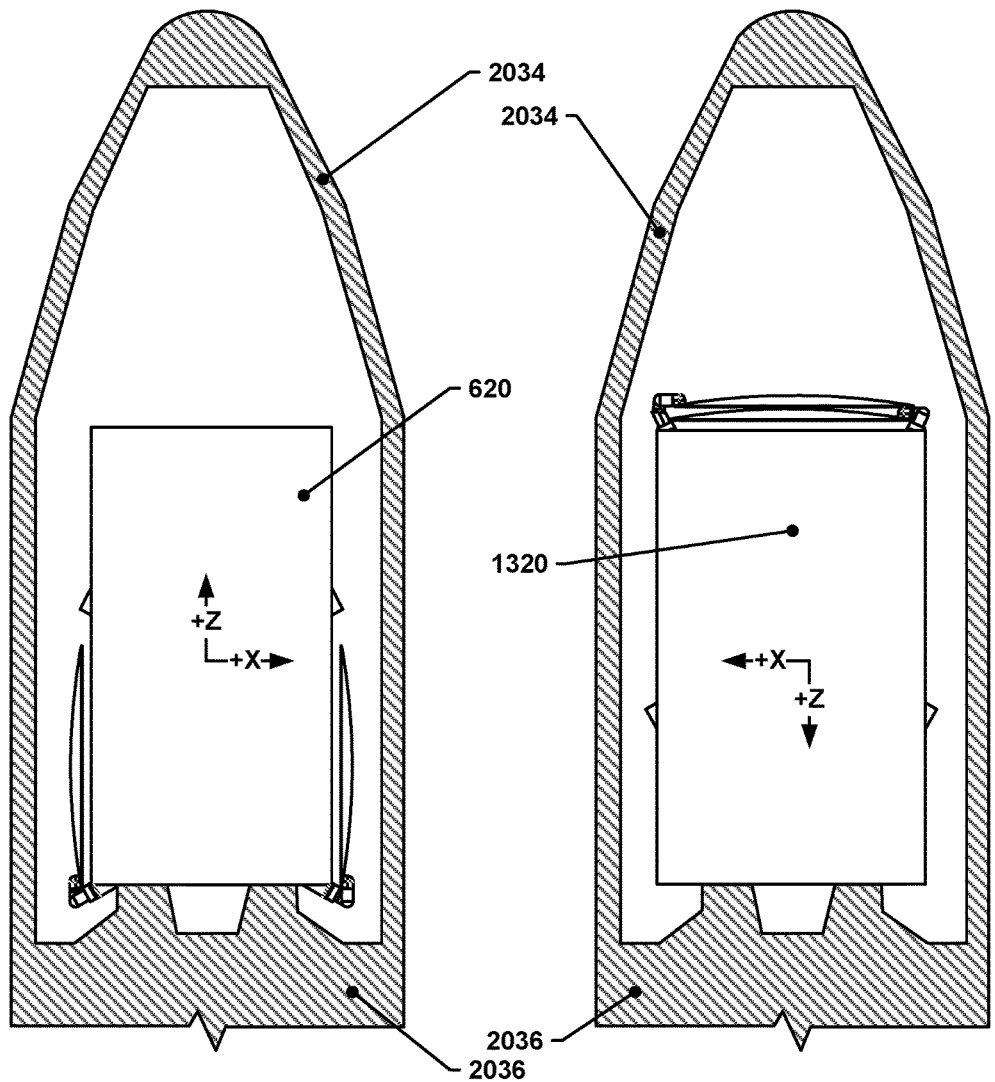
FIG. 20 depicts a side view of the example spacecraft of FIGS. 6-11 in a launch vehicle fairing.
FIG. 21 depicts a side view of the alternate example spacecraft of FIGS. 13-18 in a launch vehicle fairing.

FIG. 20 depicts the example spacecraft implementation 620 of FIGS. 6-12 in the launch configuration (with the linear extension boom and rigid antenna reflectors in the stowed configuration) and installed within a fairing or shroud 2034 of a launch vehicle 2036.

Correspondingly, FIG. 21 depicts the example spacecraft implementation 1320 of FIGS. 13-19 in the launch configuration (with the linear extension boom and rigid antenna reflectors in the stowed configuration) and installed within the fairing or shroud 2034 of the launch vehicle 2036.

As can be seen from FIGS. 20 and 21, in either implementation, the linear extension booms may, in the stowed configuration, take up very little room, allowing for more efficient use of the shroud or fairing volume by other components, such as the spacecraft body, rigid antenna reflectors, or other components.

It is also to be understood that the positioning mechanisms used to connect the rigid antenna reflectors with the linear extension booms may include one or more motor-driven or, in some cases, spring-driven, rotational joints to allow the rigid antenna reflectors to be re-oriented with respect to their angular orientation vis-à-vis the linear extension boom. In some cases, the positioning mechanisms may have only one degree of rotational freedom, although in other cases, the positioning mechanisms may have two or more degrees of rotational freedom. For example, a positioning mechanism may provide for rotation about a first axis parallel to the linear axis of the linear extension boom as well as a second axis perpendicular to the first axis; such a positioning mechanism may be referred to as a dual-axis positioning mechanism. In some implementations, the positioning mechanism may allow for rotational positioning about three or more rotational axes. If the positioning mechanism is spring-driven, then it may not be possible re-position the rigid antenna reflectors after deployment, so in most implementations, motor-driven or otherwise controllable positioning mechanisms may be used.

The linear extension booms depicted in the above examples have all been positioned at fixed, oblique angles with respect to the yaw axis, although in other implementations, the linear extension booms may be connected with the main body by a rotational joint, e.g., a rotational joint between the support structure of a linear extension boom and the main body. Such a rotational joint may allow the linear extension boom to be moved between a plurality of different angular positions with respect to the yaw axis. Such implementations may provide for additional flexibility with regard to the angular orientation of the rigid antenna reflectors with respect to the linear extension boom, and, therefore, with respect to the antenna feeds that are illuminated by the rigid antenna reflectors. Generally speaking, it may be advantageous to configure the linear extension boom for a spacecraft such that the end of the linear extension boom supporting the rigid antenna reflector may simultaneously move away from the spacecraft yaw axis and away from the antenna feed when the linear extension boom is actuated. In particular implementations, it may be beneficial to have the linear extension boom mounted or oriented such that the linear axis along which the linear extension boom extends when actuated makes an angle of between 20 and 45 degrees with the yaw axis of the spacecraft.

The use of a linear extension boom to support a rigid antenna reflector allows for the effectively infinite re-adjustment, within the maximum extendable length of the linear extension boom, of the distance between the rigid antenna reflector and the main body of the spacecraft. This provides several advantages over conventional systems with fixed-length or hinged booms.

One benefit of using a linear extension boom for deployment of rigid antenna reflectors is that focusing errors that may exist with respect to the illuminated area of the rigid antenna reflector may be corrected. A rigid antenna reflector may be thought of as analogous to an optical reflector that reflects visible light, except that the rigid antenna reflector reflects radio waves instead of light. As with dish-shaped optical reflectors, dish- or parabolic-shaped rigid antenna reflectors may focus radiation that is incident on the rigid antenna reflector from a particular direction on a focal point located some distance, i.e., the focal distance, from the rigid antenna reflector. The reflected electromagnetic radiation may be at its maximum intensity-per-unit-area for the direction in question at that focal point. This maximum radiation intensity-per-unit-area may decrease at locations further from or closer to the rigid antenna reflector, i.e., at increasing distance from the focal point, either further from or closer to the rigid antenna reflector. It is to be understood that the focal point of the rigid antenna reflector may vary depending on the angle that the electromagnetic radiation that reflects off of the rigid antenna reflector makes with respect to the rigid antenna reflector.

Figure 22:
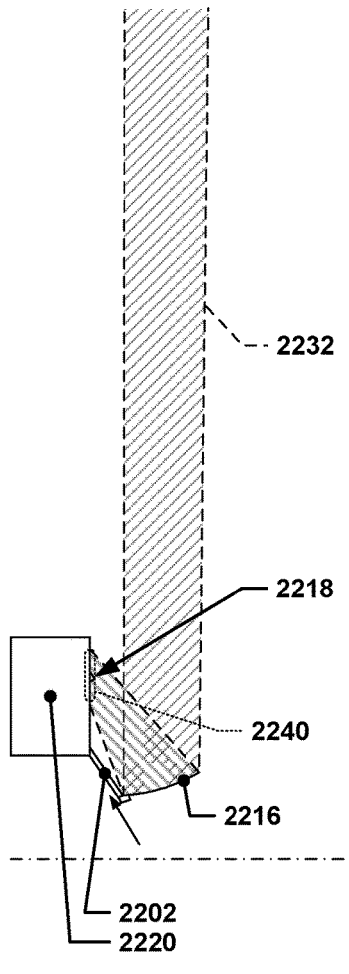
FIGS. 22-24 depict an example spacecraft with a linear extension boom extended to different degrees.

FIG. 22 depicts a simplified representation of a spacecraft 2220 having a linear extension boom 2202, a rigid antenna reflector 2216, and an antenna feed 2218. A beam path 2232 is shown; the beam path 2232, in this example, represents a notional RF signal beam that is received from a ground-based transmitter, reflected off of the rigid antenna reflector 2216, and then received by the antenna feed 2218. In FIG. 22, the linear extension boom 2202 is not fully deployed, which causes the antenna feed 2218 to be closer to the rigid antenna reflector 2216 than the focal length of the rigid antenna reflector 2216 for the indicated approach angle of the beam path 2232 with respect to the rigid antenna reflector 2216. As a result, an illumination area 2240, e.g., the area of the spacecraft 2220 that is illuminated by the RF signal beam reflected off of the rigid antenna reflector 2216, is much larger than the size of the antenna feed 2218, which means that much of the signal that is reflected off of the rigid antenna reflector 2216 is not received by the antenna feed 2218, but strikes the spacecraft 2220 instead. This results in a weaker signal at the antenna feed 2218, thereby reducing the RF transmission system performance. It may also result in undesirable heating of the spacecraft 2220, as the RF energy that strikes the spacecraft 2220 may be absorbed by the spacecraft 2220 in the form of heat energy which must then be dissipated.

Figure 23:
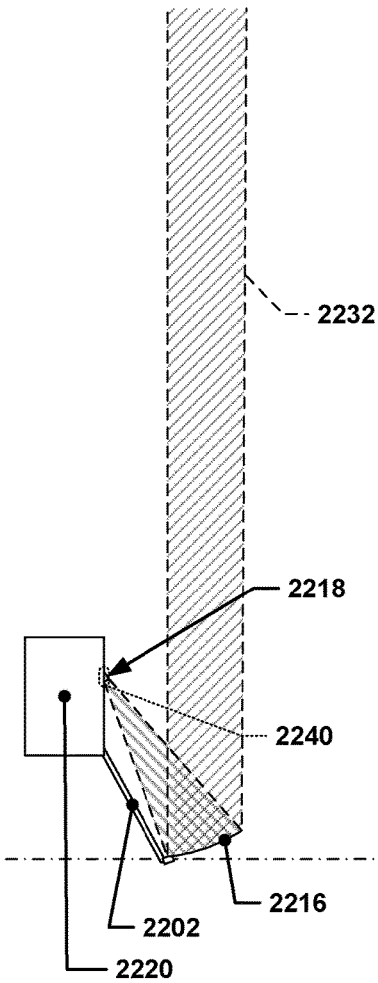

In FIG. 23, the linear extension boom 2202 has been extended further than in FIG. 22. As a result, the distance between the rigid antenna reflector 2216 and the antenna feed 2218 has increased to match the focal distance of the rigid antenna reflector 2216, which results in the illumination area 2240 shrinking such that it is tightly focused on the antenna feed 2218. The rigid antenna reflector 2216 may need to be re-oriented, e.g., using a positioning mechanism (not pictured) such that the focal point is still oriented on the antenna feed 2218 after the linear extension boom 2202 is extended. In this configuration, the efficiency of the rigid antenna reflector system may be at a maximum or near-maximum. For comparison, a dash-dot-dash line is drawn across FIGS. 22-24 to allow for comparison of the degree of extension of the linear extension boom 2202 in each of the three Figures.

Figure 24:
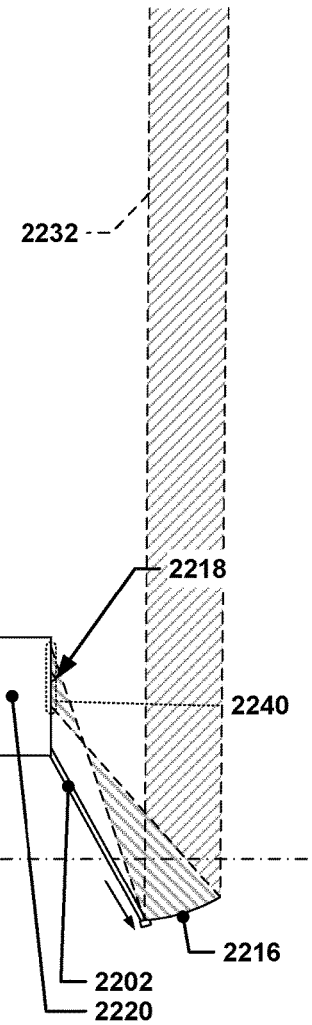

In FIG. 24, the linear extension boom 2202 has been extended to a longer length than in either previous Figure. As can be seen, this causes de-focusing of the beam path 2232, and an increase in the illuminated area 2240. Accordingly, most of the reflected RF signal will strike the spacecraft 2220 instead of the antenna feed 2218, resulting in a large decrease in rigid antenna reflector efficiency.

As can be seen, the adjustability of the length of the linear extension boom 2202 allows for more precise alignment of the focal point of the rigid antenna reflector 2216 with the antenna feed 2218. Moreover, if there is a mismatch in distance between the focal length of the rigid antenna reflector 2216 and the distance between the antenna feed 2218 and the rigid antenna reflector 2216 for whatever reason, e.g., due to thermal expansion of the linear extension boom, damage to the rigid antenna reflector, etc., such a mismatch may be corrected out by extending or retracting the linear extension boom 2202 by a corresponding amount.

Figure 25:
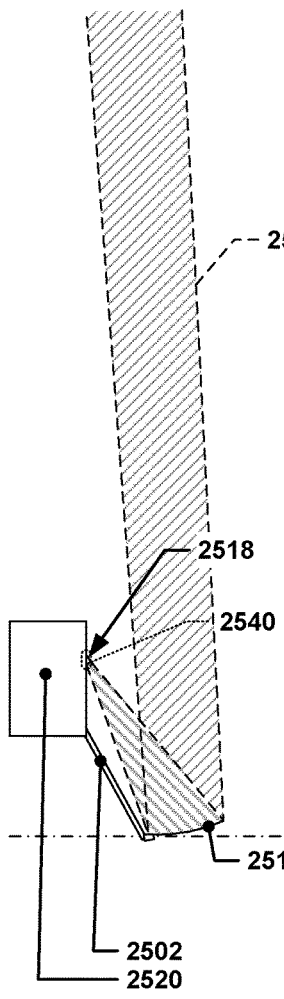
FIGS. 25-27 depict an example spacecraft with a linear extension boom extended to different degrees to accommodate a change in rigid antenna reflector orientation.

FIG. 25 depicts a simplified representation of a spacecraft 2520 similar to that depicted in FIGS. 22 through 24, with the linear extension boom 2502 extended such that a beam path 2532 is focused on an antenna feed 2518 by a rigid antenna reflector 2516. In this case, the rigid antenna reflector 2516 focuses the beam path 2532 onto an illumination area 2540 that is constrained to the antenna feed 2518, i.e., the rigid antenna reflector is operating at a high efficiency.

Figure 26:
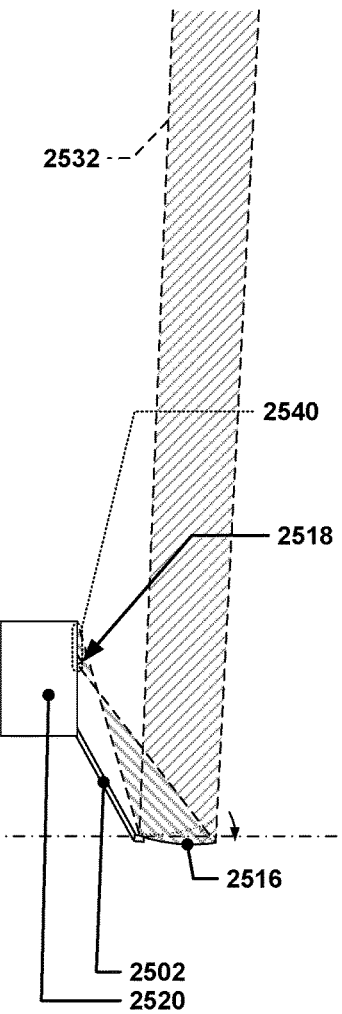

In FIG. 26, the rigid antenna reflector 2516 has been tilted, by way of a positioning mechanism, with respect to the linear extension boom 2502 and the spacecraft 2520; the length of the linear extension boom 2502 has not been changed. This may, for example, allow the rigid antenna reflector 2516 to receive an RF signal from a signal source located at a different location on the Earth's surface, e.g., such as may be needed if an earthbound transmitter/receiver were to fail and a backup earthbound transmitter/receiver were to be utilized, without having to re-orient the spacecraft 2520. In this example, the beam path 2532 approaches the spacecraft from a direction at a slight angle to one side of vertical in FIG. 25 and from a different slight angle to the opposite side of vertical in FIGS. 26 and 27. As can be seen, the re-orientation of the rigid antenna reflector 2516 may cause the distance between the rigid antenna reflector 2516 and the antenna feed 2518 to increase, which may also cause the illumination area 2540 of the beam path 2532 to increase in size and the center point of the illumination area 2540 to shift relative to the position shown in FIG. 25, thereby reducing rigid antenna reflector efficiency with respect to the amount of reflected RF signal that is receivable by the antenna feed 2518.

Figure 27:
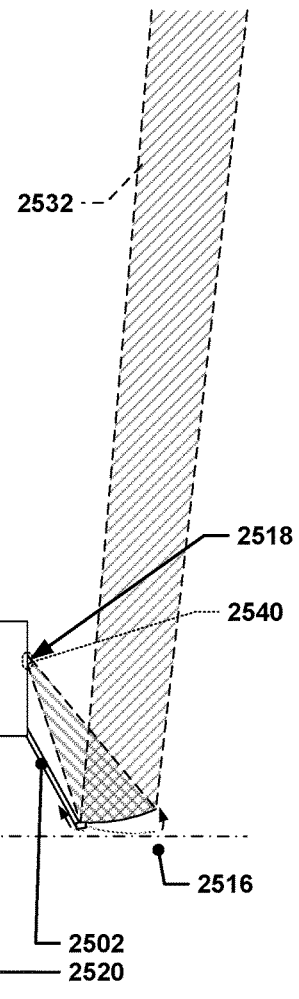

In FIG. 27, the linear extension boom 2502 has been partially retracted to reduce the distance between the antenna feed 2518 and the rigid antenna reflector 2516, and the rigid antenna reflector 2516 has been re-positioned somewhat using the positioning mechanism. This may allow the defocusing illustrated in FIG. 26 to be mitigated, and the illumination area 2540 may again be reduced in size and aligned with the antenna feed 2518. The use of the linear extension boom 2502 allows for such fine-tuning of the illumination area and of the center location of the illumination area for a variety of different potential beam paths.

The use of a linear extension boom may also allow a spacecraft to make more efficient use of various payload systems. For example, a spacecraft may have multiple antenna feeds that may be used with a particular rigid antenna reflector. Such multiple antenna feeds may take the form of backup or secondary, redundant antenna feeds that may be used if a primary antenna feed experiences a decrease in performance or fails completely or they may be antenna feeds designed for different mission parameters. For example, a spacecraft may have one antenna feed tailored to have a high efficiency with respect to RF signals of a certain wavelength, and may have a secondary antenna feed configured to have a high efficiency with respect to RF signals of another wavelength—it may be desirable to be able to switch between such antenna feeds at will. While switching between such multiple antenna feeds may be accomplished by re-orienting the rigid antenna reflector that reflects the RF signals involved such that the desired antenna feed is illuminated, the use of a linear extension boom may allow for such re-orientation to be coupled with an extension or retraction of the linear extension boom such that the focal point of the rigid antenna reflector is generally collocated with the antenna feed, thus increasing the performance of the antenna system.

Figure 28:
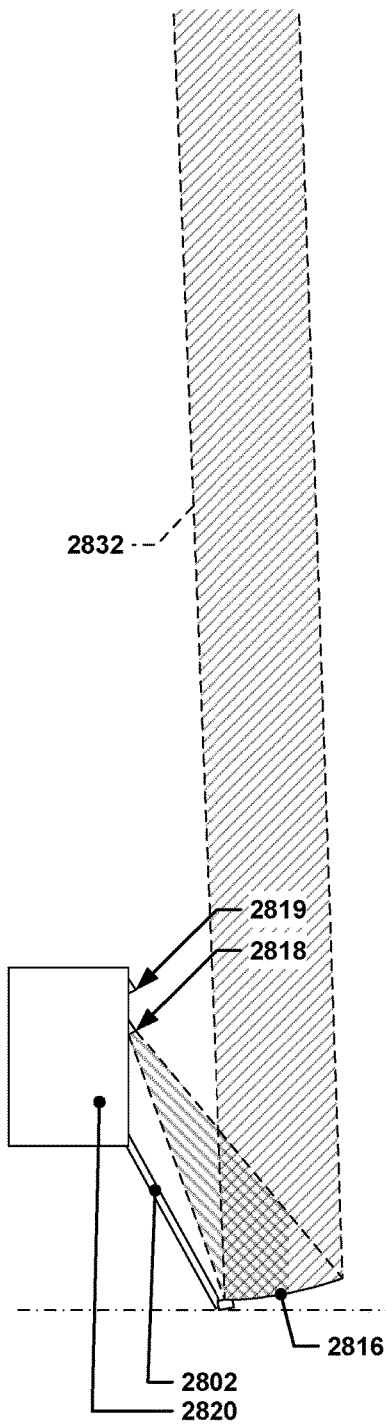
FIGS. 28 and 29 depict an example spacecraft with a linear extension boom that may be extended or retracted to utilize one of two different antenna feeds.
Figure 29:
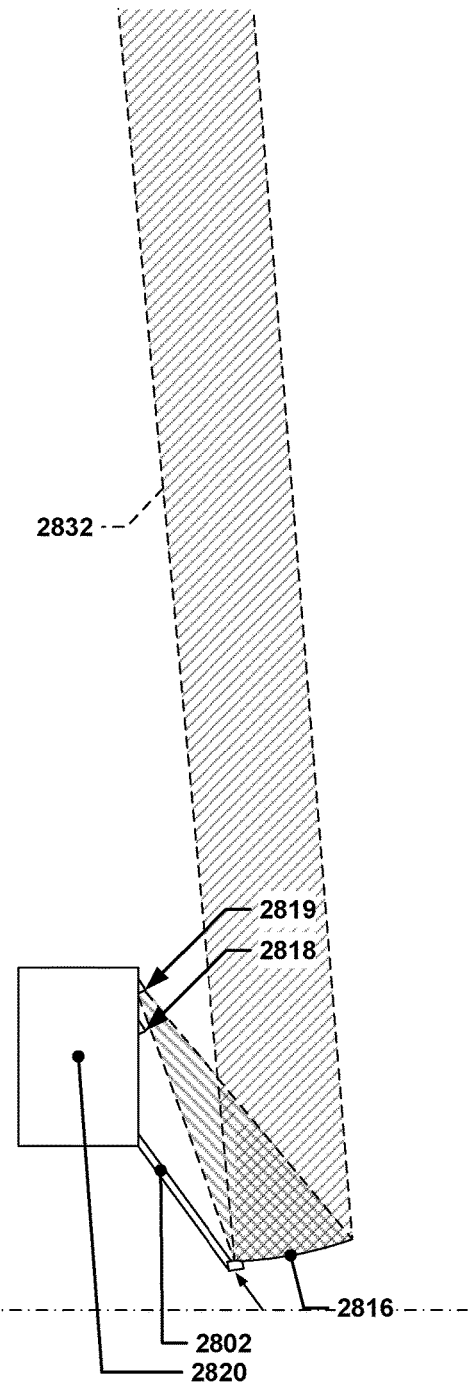

FIG. 28 depicts an example of a spacecraft with a redundant antenna feed system. As can be seen, a spacecraft 2820 may have an antenna feed 2818 and a secondary antenna feed 2819 (if there is already a secondary or second antenna feed due, for example, to the use of a second linear extension boom, then the secondary antenna feed 2819 may also be referred to herein as a third antenna feed); the secondary antenna feed 2819 may be located in a different location on the spacecraft 2820 than the antenna feed 2818. A rigid antenna reflector 2816 may be located at the end of a linear extension boom 2802 and supported by a positioning mechanism of some sort. In FIG. 28, the linear extension boom 2802 and the rigid antenna reflector 2816 are positioned, e.g., with the linear extension boom extended to a second length, such that the focal point of the rigid antenna reflector 2816 is aligned with and collocated with the antenna feed 2818, i.e., the antenna feed 2818 is illuminated by the rigid antenna reflector 2816. In FIG. 29, the rigid antenna reflector 2816 has been slightly re-oriented, and the linear extension boom 2802 has been shortened in length slightly, e.g., to a third length or a secondary second length, to re-focus the focal point of the rigid antenna reflector 2816 on the secondary antenna feed 2819. Thus, regardless of which antenna feed is used, the linear extension boom 2802 permits the rigid antenna reflector 2816 to be positioned such that the focal point of the rigid antenna reflector 2816 is collocated with the antenna feed in use, thereby mitigating or eliminating any potential rigid antenna reflector performance issues that may arise from re-orienting the rigid antenna reflector 2816 to point at a different antenna feed.

Although several implementations of the concepts disclosed herein have been described in detail herein with reference to the accompanying drawings, it is to be understood that this disclosure is not limited to these precise embodiments, and that various changes and modifications may be effected therein by one skilled in the art without departing from the scope or spirit of the disclosure as defined in the appended claims.

What is claimed is:

1. A spacecraft, the spacecraft comprising:
   a main body;
   a first antenna feed;
   a second antenna feed;
   a first rigid antenna reflector;
   a second rigid antenna reflector;
   a first linear extension boom; and
   a second linear extension boom, wherein:
   the first linear extension boom has a proximal end and a distal end,
   the second linear extension boom has a proximal end and a distal end,
   the first linear extension boom is configured to cause, when actuated, the distal end of the first linear extension boom to translate along a first linear axis with respect to the proximal end of the first linear extension boom,
   the second linear extension boom is configured to cause, when actuated, the distal end of the second linear extension boom to translate along a second linear axis with respect to the proximal end of the second linear extension boom, the first rigid antenna reflector is coupled with the first distal end of the first linear extension boom, the second rigid antenna reflector is coupled with the distal end of the second linear extension boom, the proximal ends of the first linear extension boom and the second linear extension boom are both coupled with the main body, the first linear extension boom and the first rigid antenna reflector are configured such that the first rigid antenna reflector and the first linear extension boom are transitionable from a first stowed configuration to a first deployed configuration, the second linear extension boom and the second rigid antenna reflector are configured such that the second rigid antenna reflector and the second linear extension boom are transitionable from a second stowed configuration to a second deployed configuration, the first linear extension boom has a first length in the first stowed configuration and a second length in the first deployed configuration, the second linear extension boom has a third length in the second stowed configuration and a fourth length in the second deployed configuration, the first rigid antenna reflector is positioned a first distance from the main body in the first stowed configuration and a second distance from the main body in the first deployed configuration, the second rigid antenna reflector is positioned a third distance from the main body in the second stowed configuration and a fourth distance from the main body in the second deployed configuration, the first length and the first distance are each respectively less than the second length and the second distance, the third length and the third distance are each respectively less than the fourth length and the fourth distance, the first rigid antenna reflector illuminates the first antenna feed when in the first deployed configuration, and the second rigid antenna reflector illuminates the second antenna feed when in the second deployed configuration.

2. The spacecraft of claim 1, wherein the first rigid antenna reflector moves relative to the first antenna feed when the first linear extension boom is actuated.

3. The spacecraft of claim 1, wherein the proximal end of the first linear extension boom is coupled with the main body by way of a rotational joint that is configured to allow the first linear extension boom to be rotated about a pivot axis relative to the main body.

4. The spacecraft of claim 1, wherein the first linear extension boom is a storable tubular extendible mast (STEM).

5. The spacecraft of claim 4, wherein the STEM comprises:
a tube having a long axis parallel to the first linear axis;
a winding spool configured to rotate about a winding axis perpendicular to the first linear axis;
a drive motor configured to rotate the winding spool;
one or more guides configured to engage with an outer surface of the tube; and
a support structure that supports the winding spool and the one or more guides in a spaced-apart manner, wherein:
the tube passes through the one or more guides,
a first end of the tube is flattened and a circumferential edge of the first end of the tube is coupled with the winding spool and is parallel to the winding axis, and
the one or more guides, the tube, and the winding spool are arranged such that when the winding spool is rotated in a first direction, the tube flattens out as it is drawn onto the winding spool and the distance between the winding spool and a second end of the tube opposite the first end decreases, and when the winding spool is rotated in a second direction opposite the first direction, the tube returns into a tubular shape as the tube unwinds from the winding spool and the distance between the winding spool and the second end increases.

6. The spacecraft of claim 5, wherein the tube has a slit along the long axis.

7. The spacecraft of claim 1, further comprising a positioning mechanism, wherein:
the first rigid antenna reflector is coupled with the distal end of the first linear extension boom via the positioning mechanism, and
the positioning mechanism is configured to adjust an angular orientation of the first rigid antenna reflector with respect to the first linear extension boom.

8. The spacecraft of claim 7, wherein the positioning mechanism is a dual-axis positioning mechanism configured to adjust the angular orientation of the first rigid antenna reflector about two different rotational axes with respect to the first linear extension boom.

9. The spacecraft of claim 1, wherein:
the spacecraft has a yaw axis that is oriented earthward when the spacecraft is on-orbit, and
the first linear extension boom is coupled with the main body such that the first linear axis forms an oblique angle with respect to the yaw axis.

10. The spacecraft of claim 9, wherein the oblique angle is between 20 and 45 degrees.

11. The spacecraft of claim 1, wherein:
the spacecraft is configured to be mounted in a launch vehicle for delivery to orbit;
the main body has a forward surface that is oriented away from an aft end of the launch vehicle when the spacecraft is mounted in the launch vehicle;
the spacecraft is reconfigurable between a launch configuration, in which the first rigid antenna reflector and the first linear extension boom are in the first stowed configuration, and an on-orbit configuration, in which the first rigid antenna reflector and the first linear extension boom are in the first deployed configuration;
the first rigid antenna reflector is stowed forward of the forward surface of the main body when the spacecraft is in the launch configuration; and
the first rigid antenna reflector is located further forward of the forward surface when the spacecraft is in the on-orbit configuration than when the spacecraft is in the launch configuration.

12. The spacecraft of claim 11, wherein the spacecraft is configured such that the forward surface is oriented in an anti-Earth direction when the spacecraft is on-orbit.

13. The spacecraft of claim 1, wherein:
the spacecraft is configured to be mounted in a launch vehicle for delivery to orbit;
the main body has a forward surface that is oriented away from an aft end of the launch vehicle when the spacecraft is mounted in the launch vehicle and an aft surface that is oriented towards the aft end of the launch vehicle when the spacecraft is mounted in the launch vehicle;

the spacecraft is reconfigurable between a launch configuration, in which the first rigid antenna reflector and the first linear extension boom are in the first stowed configuration, and an on-orbit configuration, in which the first rigid antenna reflector and the first linear extension boom are in the first deployed configuration;

the first rigid antenna reflector is stowed adjacent to a side of the main body of the spacecraft spanning between the forward surface of the main body and the aft surface of the main body when the spacecraft is in the launch configuration; and the first rigid antenna reflector is positioned further aft of the forward surface when the spacecraft is in the on-orbit configuration than when the spacecraft is in the launch configuration.

14. The spacecraft of claim 13, wherein the spacecraft is configured such that the forward surface is oriented earthward when the spacecraft is on-orbit.

15. The spacecraft of claim 1, further comprising a third antenna feed, wherein:

the first linear extension boom and the first rigid antenna reflector are further configured such that the first rigid antenna reflector and the first linear extension boom are transitionable to a secondary first deployed configuration, the first linear extension boom has a secondary second length in the secondary first deployed configuration, the first rigid antenna reflector is positioned a secondary second distance from the main body in the secondary first deployed configuration, the first length and the first distance are each respectively less than the secondary second length and the secondary second distance, and the first rigid antenna reflector illuminates the third antenna feed when in the secondary first deployed configuration.

16. The spacecraft of claim 1, wherein the first antenna feed and the second antenna feed are located on opposite sides of the main body.

17. A spacecraft, the spacecraft comprising:
a main body;
a first antenna feed;
a second antenna feed;
a first rigid antenna reflector; and
a first linear extension boom, wherein:
the first linear extension boom has a proximal end and a distal end,
the first linear extension boom is configured to cause, when actuated, the distal end to translate along a first linear axis with respect to the proximal end,
the first rigid antenna reflector is coupled with the distal end of the first linear extension boom,
the proximal end of the first linear extension boom is coupled with the main body,
the first linear extension boom and the first rigid antenna reflector are configured such that the first rigid antenna reflector and the first linear extension boom are transitionable between a first stowed configuration, a first deployed configuration, and a secondary first deployed configuration,
the first linear extension boom has a first length in the first stowed configuration, a second length in the first deployed configuration, and a secondary second length in the secondary first deployed configuration, the first rigid antenna reflector is positioned a first distance from the main body in the first stowed configuration, a second distance from the main body in the first deployed configuration, and a secondary second distance in the secondary first deployed configuration, the first length and the first distance are each respectively less than the second length and the second distance, the first length and the first distance are each respectively less than the secondary second length and the secondary second distance, the first rigid antenna reflector illuminates the first antenna feed when in the first deployed configuration, and the first rigid antenna reflector illuminates the second antenna feed when in the secondary first deployed configuration.

18. The spacecraft of claim 17, wherein the proximal end of the first linear extension boom is coupled with the main body by way of a rotational joint that is configured to allow the first linear extension boom to be rotated about a pivot axis relative to the main body.

19. The spacecraft of claim 17, wherein the first linear extension boom is a storable tubular extendible mast (STEM) that comprises:

a tube having a long axis parallel to the first linear axis;
a winding spool configured to rotate about a winding axis perpendicular to the first linear axis;
a drive motor configured to rotate the winding spool;
one or more guides configured to engage with an outer surface of the tube; and
a support structure that supports the winding spool and the one or more guides in a spaced-apart manner, wherein:
the tube passes through the one or more guides,
a first end of the tube is flattened and a circumferential edge of the first end of the tube is coupled with the winding spool and is parallel to the winding axis, and
the one or more guides, the tube, and the winding spool are arranged such that when the winding spool is rotated in a first direction, the tube flattens out as it is drawn onto the winding spool and the distance between the winding spool and a second end of the tube opposite the first end decreases, and when the winding spool is rotated in a second direction opposite the first direction, the tube returns into a tubular shape as the tube unwinds from the winding spool and the distance between the winding spool and the second end increases.

20. The spacecraft of claim 17, further comprising a positioning mechanism, wherein:

the first rigid antenna reflector is coupled with the distal end of the first linear extension boom via the positioning mechanism, and the positioning mechanism is configured to adjust an angular orientation of the first rigid antenna reflector with respect to the first linear extension boom.

* * * * *